United States Patent
Acero et al.

(10) Patent No.: US 7,409,346 B2
(45) Date of Patent: Aug. 5, 2008

(54) TWO-STAGE IMPLEMENTATION FOR PHONETIC RECOGNITION USING A BI-DIRECTIONAL TARGET-FILTERING MODEL OF SPEECH COARTICULATION AND REDUCTION

(75) Inventors: Alejandro Acero, Bellevue, WA (US); Dong Yu, Kirkland, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 11/069,474

(22) Filed: Mar. 1, 2005

(65) Prior Publication Data

US 2006/0200351 A1 Sep. 7, 2006

Related U.S. Application Data

(60) Provisional application No. 60/625,222, filed on Nov. 5, 2004.

(51) Int. Cl.
G10L 15/10 (2006.01)
(52) U.S. Cl. ...................................... 704/254
(58) Field of Classification Search .................. 704/254
See application file for complete search history.

(56) References Cited

U.S. PATENT DOCUMENTS 6,618,699 B1* 9/2003 Lee et al. .................... 704/209
7,050,975 B2* 5/2006 Deng et al. ............... 704/256.3
7,117,148 B2* 10/2006 Droppo et al. .............. 704/228
7,206,741 B2* 4/2007 Deng et al. .................. 704/254

OTHER PUBLICATIONS

Bilmes, J., "Graphical Models and Automatic Speech Recognition", Mathematical Foundations of Speech and Language Processing, Springer-Verlag New York, Inc., pp. 191-245, 2004.
Bridle et al., J. S., "An Investigation of Segmental Hidden Dynamic Models of Speech Coarticulation for Automatic Speech Recognition", Report of a Project at the 1998 Workshop on Language Engineering, Center for Language and Speech Processing at John Hopkins University, pp. 1-61, 1998.S.

(Continued)

Primary Examiner—Susan McFadden
(74) Attorney, Agent, or Firm—Theodore M. Magee; Westman, Champlin & Kelly, P.A.

(57) ABSTRACT

A structured generative model of a speech coarticulation and reduction is described with a novel two-stage implementation. At the first stage, the dynamics of formants or vocal tract resonance (VTR) are generated using prior information of resonance targets in the phone sequence. Bi-directional temporal filtering with finite impulse response (FIR) is applied to the segmental target sequence as the FIR filter's input. At the second stage the dynamics of speech cepstra are predicted analytically based on the FIR filtered VTR targets. The combined system of these two stages thus generates correlated and causally related VTR and cepstral dynamics where phonetic reduction is represented explicitly in the hidden resonance space and implicitly in the observed cepstral space. The combined system also gives the acoustic observation probability given a phone sequence. Using this probability, different phone sequences can be compared and ranked in terms of their respective probability values. This then permits the use of the model for phonetic recognition.

20 Claims, 14 Drawing Sheets

OTHER PUBLICATIONS

Chelba et al., C., "Structured language modeling", Computer Speech and Language, vol. 14, pp. 283-332, Oct. 2000.

Deng, L., "A generalized hidden Markov model with state-conditioned trend functions of time for the speech signal", Signal Processing, vol. 27, pp. 65-78, 1992.

Deng, L., "A dynamic, feature-based approach to the interface between phonology and phonetics for speech modeling and recognition", Speech Communication, vol. 24, No. 4, pp. 299-323, Jul. 1998.

Deng, L., "Computational Models for Speech Production", Computational Models of Speech Pattern Processing, Springer-Verlag Berlin Heidelberg, pp. 199-213, 1998.

Deng, L., "Switching Dynamic System Models for Speech Articulation and Acoustics", Mathematical Foundations of Speech and Language Processing, Springer-Verlag New York, Inc., pp. 115-134, 2004.

Deng et al., L., "Context-dependent Markov model structured by locus equations: Applications to phonetic classification", The Journal of the Acoustical Society of America, vol. 96, No. 4, pp. 2008-2025, Oct. 1994.

Deng et al., L., "A Structured Speech Model with Continuous Hidden Dynamics and Prediction-Residual Training for Tracking Vocal Tract Resonances", 2004 IEEE International Conference on Acoustics, Speech, and Signal Processing, vol. 1, pp. 557-560, May 2004.

Deng et al., L., "Tracking Vocal Tract Resonances Using a Quantized Nonlinear Function Embedded in a Temporal Constraint", IEEE Transactions on Speech and Audio Processing, Mar. 2004.

Ficus, J. G., "A Post-Processing System to Yield Reduced Word Error Rates: Recognizer Output Voting Error Reduction", 1997 IEEE Workshop on Automatic Speech Recognition and Understanding Proceedings, pp. 347-354, 1997.

Gao et al., Y., "Multistage Coarticulation Model Combining Articulatory, Formant and Cepstral Features", Proceedings of the ICSLP, vol. 1, pp. 25-28, 2000.

Gay, T. "Effect of speaking rate on vowel formant movements", The Journal of the Acoustical Society of America, vol. 63, No. 1, pp. 223-230, Jan. 1978.

Siu et al., M., "Parametric Trajectory Mixtures for LVCSR", 5th International Conference on Spoken Language Processing, Sydney, Australia, pp. 3269-3272, 1998.

Hertz, S. R., "Streams, phones and transitions: toward a new phonological and phonetic model of formant timing", Journal of Phonetics, vol. 19, pp. 91-109, 1991.

Lindblom, B., "Spectrographic Study of Vowel Reduction", Journal of the Acoustical Society of America, vol. 35, No. 11, pp. 1773-1781, Nov. 1963.

Holmes et al., W.J., "Probabilistic-trajectory segmental HMMs", Computer Speech and Language, vol. 13, pp. 3-37, 1999.

Klatt, D. H., "Software for a cascade/parallel formant synthesizer", Journal of the Acoustical Society of America, vol. 67, No. 3, pp. 971-995, Mar. 1980.

Lindblom, B., "Explaining Phonetic Variation: A Sketch of the H & H Theory", Speech Production and Speech Modelling, Kluwer Academic Publishers, pp. 403-439, 1990.

Ma et al., J. Z., "Efficient Decoding Strategies for Conversational Speech Recognition Using a Constrained Nonlinear State-Space Model", IEEE Transactions on Speech and Audio Processing, vol. 11, No. 6, pp. 590-602, Nov. 2003.

Moon et al., S., "Interaction between duration, context, and speaking style in English stressed vowels", Journal of the Acoustical Scoeity of America, vol. 96, No. 1, pp. 39-55, Jul. 1994.

Ostendorf et al., M., "From HMM's to Segment Models: A Unified View of Stochastic Modeling for Speech Recognition", IEEE Transactions on Speech and Audio Processing, vol. 4, No. 5, pp. 360-378, Sep. 1996.

Pitermann et al., M., "Effect of speaking rate and constrastive stress on formant dynamics and vowel perception", Journal of the Acoustical Society of America, vol. 107, No. 6, pp. 3425-3437, Jun. 2000.

POls, L C. W., "Psycho-acoustics and Speech Perception", Computational Models of Speech Pattern Processing, Springer-Verlag Berlin Heidelberg, pp. 10-17, 1999.

Rose et al., R. C., "The potential role of speech production models in automatic speech recognition", Journal of the Acoustical Society of America, vol. 99, No. 3, pp. 1699-1709, Mar. 1996.

Stevens, K. N., "On the quantal nature of speech", Journal of Phonetics, vol. 17, 1989.

Sun et al., J., "An overlapping-feature-based phonological model incorporating linguistic constraints: Applications to speech recognition", Journal of the Acoustical Society of America, vol. III, No. 2, pp. 1086-1101, Feb. 2002.

van Bergem, D. R., "Acoustic vowel reduction as a function of sentence accent, word stress, and word class", Speech Communication, vol. 12, pp. 1-23 1993.

Wang et al., W., "The Use of a Linguistically Motivated Language Model in Conversational Speech Recognition", 2004 IEEE International Conference on Acoustics, Speech and Signal Processing, vol. 1, pp. 261-264, May 2004.

Wouters et al., J., "Control of Spectral Dynamics in Concatenative Speech Synthesis", IEEE Transactions on Speech and Audio Processing, vol. 9, No. 1, pp. 30-38, Jan. 2001.

Zhou et al., J., "Coatriculation Modeling by Embedding a Target-Directed Hidden Trajectory Model into HMM—Model and Training", 2003 IEEE International Conference on Acoustics, Speech, and Signal Processing, vol. 1, pp. 744-747, Apr. 2003.

Kamm et al., T., "Vocal tract normalization in speech recognition: Compensating for systematic speaker variability", The Journal of the Acoustical Society of America, vol. 97, No. 5, Pt. 2, pp. 3246-3247, May 1995.

Wegmann et al., S., "Speaker Normalization on Conversational Telephone Speech", IEEE International Conference on Acoustics, Speech, and Signal Processing Conference Proceedings, pp. 339-341, May 1996.

Ma et al., J., "A mixed-level switching dynamic system for continuous speech recognition", Computer Speech and Language, vol. 18, pp. 49-65, 2004.

Zweig, G., "Bayesian network structures and inference techniques for automatic speech recogntion", Computer Speech and Language, vol. 17, pp. 173-193, 2003.

Bilmes, J. "Buried Markov models: a graphical-modeling approach to automatic speech recognition", Computer Speech and Language, vol. 17, pp. 213-231, 2003.

Digalakis et al., V., "Rapid Speech Recognizer Adaptation to New Speakers", John Hopkins University, Oct. 1998.

Hajic et al., J., "Core Natural Language Processing Technology Applicable to Multiple Languages", Final Report for Center for Language and Speech Processing, John Hopkins University, 1998.

Deng et al., L., "A Quantitative Model for Formant Dynamics and Contextually Assimilated Reduction in Fluent Speech", ICSLP 2004, Jeju, Korea, 2004.

Eide et al., E., "A Parametric Approach to Vocal Tract Length Normalization," IEEE Proc. ICASSP, pp. 346-348, 1996.

Lee, et al., L., "A Frequency Warping Approach to Speaker Normalization," IEEE Transactions on Speech and Audio Processing, vol. 6, No. 1, pp. 49-60, Jan. 1998.

Welling et al., L., "A Study on Speaker Normalization Using Vocal Tract Normalization and Speaker Adaptive Training", IEEE Proceedings of ICASSP, vol. 2, pp. 797-800, May 1998.

Zhan et al., P., "Speaker Normalization Based on Frequency Warping," IEEE Proceedings of ICASSP, pp. 1039-1042, 1997.

Zhan et al., P., "Vocal Tract Length Normalization for Large Vocabulary Continuous Speech Recognition", *CMU-CS-97-148*, Carnegie Mellon University, Pittsburgh, PA, May 1997.

van Santen, J. P. H, "Contextual effects on vowel duration," Speech Communication, vol. 11, No. 6, pp. 513-546, Dec. 1992.

Moon et al., S., "Interaction between duration, context, and speaking style in English stressed vowels," The Journal of the Acoustical Society of America, vol. 96, No. 1, pp. 40-55, Jul. 1994.

Wouters et al., J., "Control of Spectral Dynamics in Concatenative Speech Synthesis," IEEE Transactions on Speech and Audio Processing, vol. 9, No. 1, pp. 30-38, Jan. 2001.

Deng, L., "Computational Models for Speech Production," in Computational Models of Speech Pattern Processing, (K. Ponting Ed.), Berlin: Springer, pp. 199-213, 1999.

Ma et al., J. Z., "Target-Directed Mixture Dynamic Models for Spontaneous Speech Recognition," IEEE, Transactions on Speech and Audio Processing, vol. 12, No. 1, pp. 47-58, Jan. 2004.

Deng, Li et al., Speech Processing—*A Dynamic and Optimization-Oriented Approach*, chapter 13, Marcel Dekker Inc., New York, NY, 2003.

Deng et al., L., "A Bi-Directional Target-Filtering Model of Speech Coarticulation and Reduction: Two-State Implementation for Phonetic Recognition", IEEE Transactions of Speech and Audio Processing, Jun. 2004.

* cited by examiner

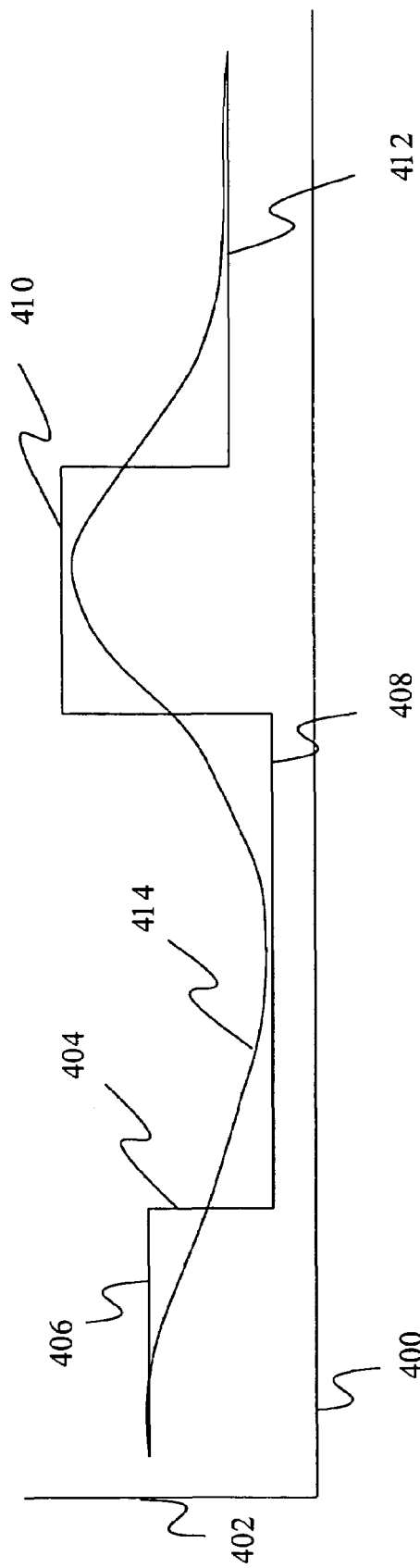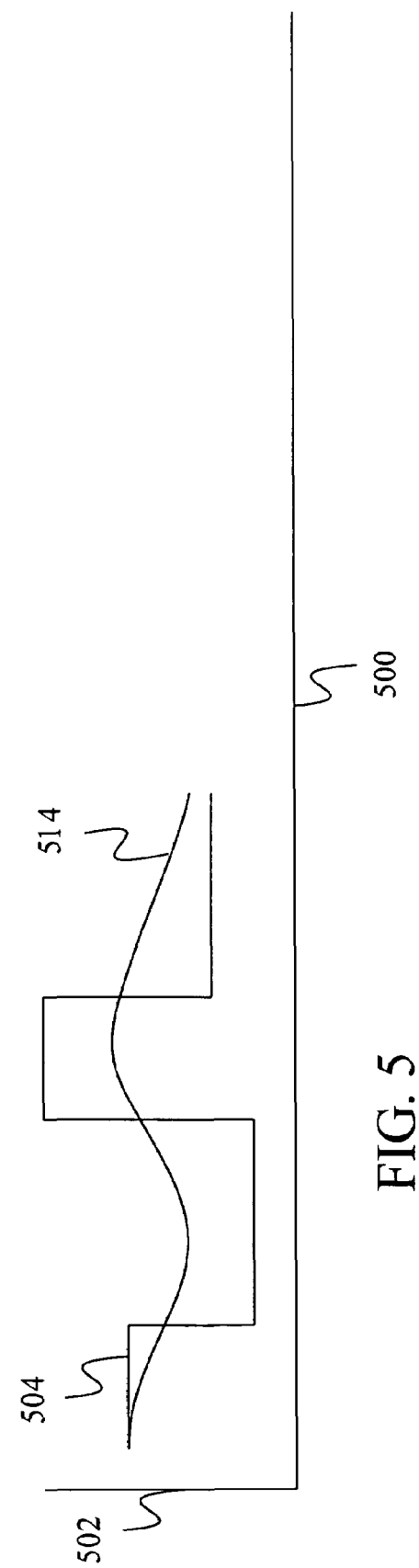

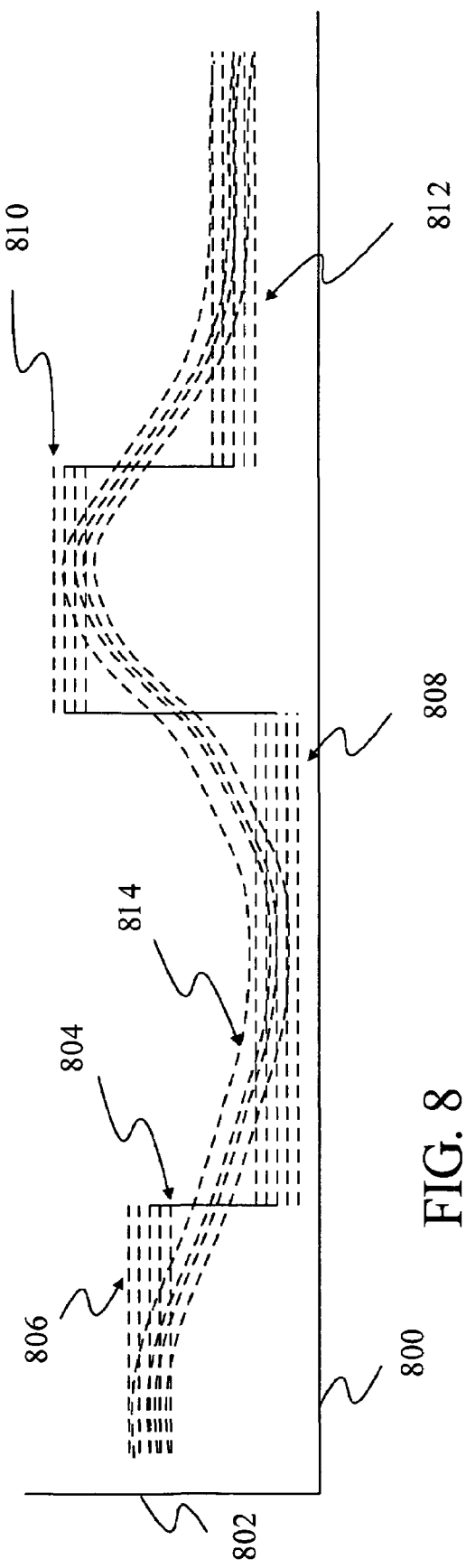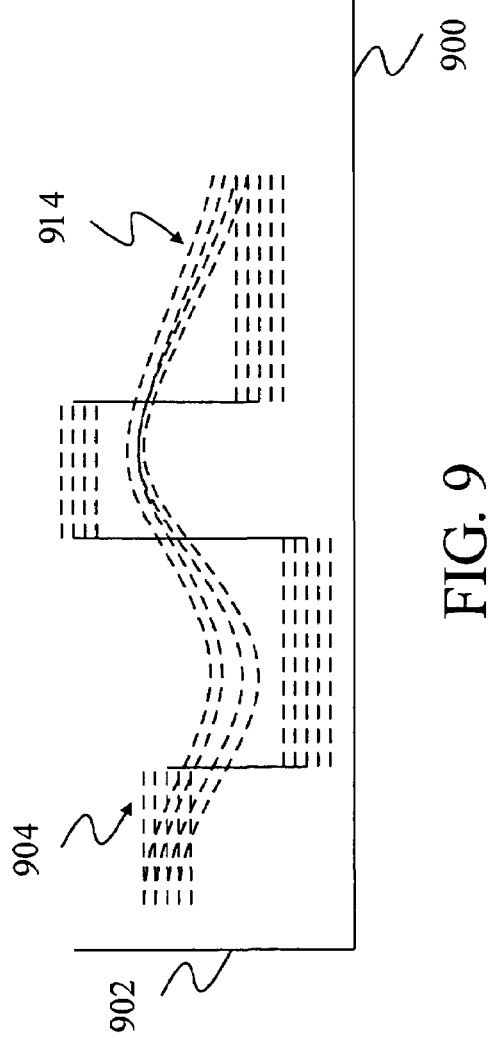
FIG. 8
FIG. 9

US 7,409,346 B2

TWO-STAGE IMPLEMENTATION FOR PHONETIC RECOGNITION USING A BI-DIRECTIONAL TARGET-FILTERING MODEL OF SPEECH COARTICULATION AND REDUCTION

The present application is based on and claims the benefit of U.S. provisional patent application Ser. No. 60/625,222, filed Nov. 5, 2004, the content of which is hereby incorporated by reference in its entirety.

CROSS REFERENCE TO RELATED APPLICATION

Reference is made to co-pending and commonly assigned U.S. patent application Ser. No. 11/071,904, filed Mar. 1, 2005, entitled "ACOUSTIC MODELS WITH STRUCTURED HIDDEN DYNAMICS WITH INTEGRATION OVER MANY POSSIBLE HIDDEN TRAJECTORIES", the content of which is hereby incorporated by reference in its entirety.

BACKGROUND OF THE INVENTION

The present invention relates to models of speech. In particular, the present invention relates to vocal tract resonance (VTR) models of structured speech and integrating the VTR models into cepstra prediction.

Human speech contains spectral prominences or VTRs. These VTRs carry a significant amount of the information contained in human speech.

In the past, attempts have been made to model the VTRs associated with particular phonetic units, such as phonemes, using discrete state models such as a Hidden Markov Model. Such models have been less than ideal, however, because they do not perform well when the speaking rate increases or the articulation effort of the speaker decreases.

Research into the behavior of VTRs during speech indicates that one possible reason for the difficulty of conventional Hidden Markov Model based systems in handling fluent speech is that during fluent speech the static VTR values and hence the static acoustic information for different classes of phonetic units become very similar as the speaking rate increases or the articulation effort decreases.

Although this phenomenon, known as reduction, has been observed in human speech, an adequate and quantitative model for predicting such behavior in VTR tracts has not been developed. As such, a model is needed that predicts the observed dynamic patterns of the VTRs based on the interaction between phonetic context, speaking rate, and speaking style.

SUMMARY OF THE INVENTION

A structured generative model of a speech coarticulation and reduction is described with a novel two-stage implementation. At the first stage, the dynamics of formants or vocal tract resonance (VTR) are generated using prior information of resonance targets in the phone sequence. Bi-directional temporal filtering with finite impulse response (FIR) is applied to the segmental target sequence as the FIR filter's input. At the second stage the dynamics of speech cepstra are predicted analytically based on the FIR filtered VTR targets. The combined system of these two stages thus generates correlated and causally related VTR and cepstral dynamics where phonetic reduction is represented explicitly in the hidden resonance space and implicitly in the observed cepstral space. The combined system also gives the acoustic observation probability given a phone sequence. Using this probability, different phone sequences can be compared and ranked in terms of their respective probability values. This then permits the use of the model for phonetic recognition.

BRIEF DESCRIPTION OF THE DRAWINGS

FIG. 4 provides a graph of a target sequence for a VTR and a predicted VTR trajectory using a first VTR model of the present invention.

FIG. 5 provides a graph of a target sequence with shorter durations than FIG. 4 and a corresponding predicted VTR trajectory using the VTR model of the present invention.

FIG. 8 provides a graph of a target sequence distribution for a VTR and a predicted VTR trajectory distribution using a second VTR model of the present invention.

FIG. 9 provides a graph of a target sequence with shorter durations than FIG. 8 and a corresponding predicted VTR trajectory using the VTR model of the present invention.

DETAILED DESCRIPTION OF ILLUSTRATIVE EMBODIMENTS

Figure 1:
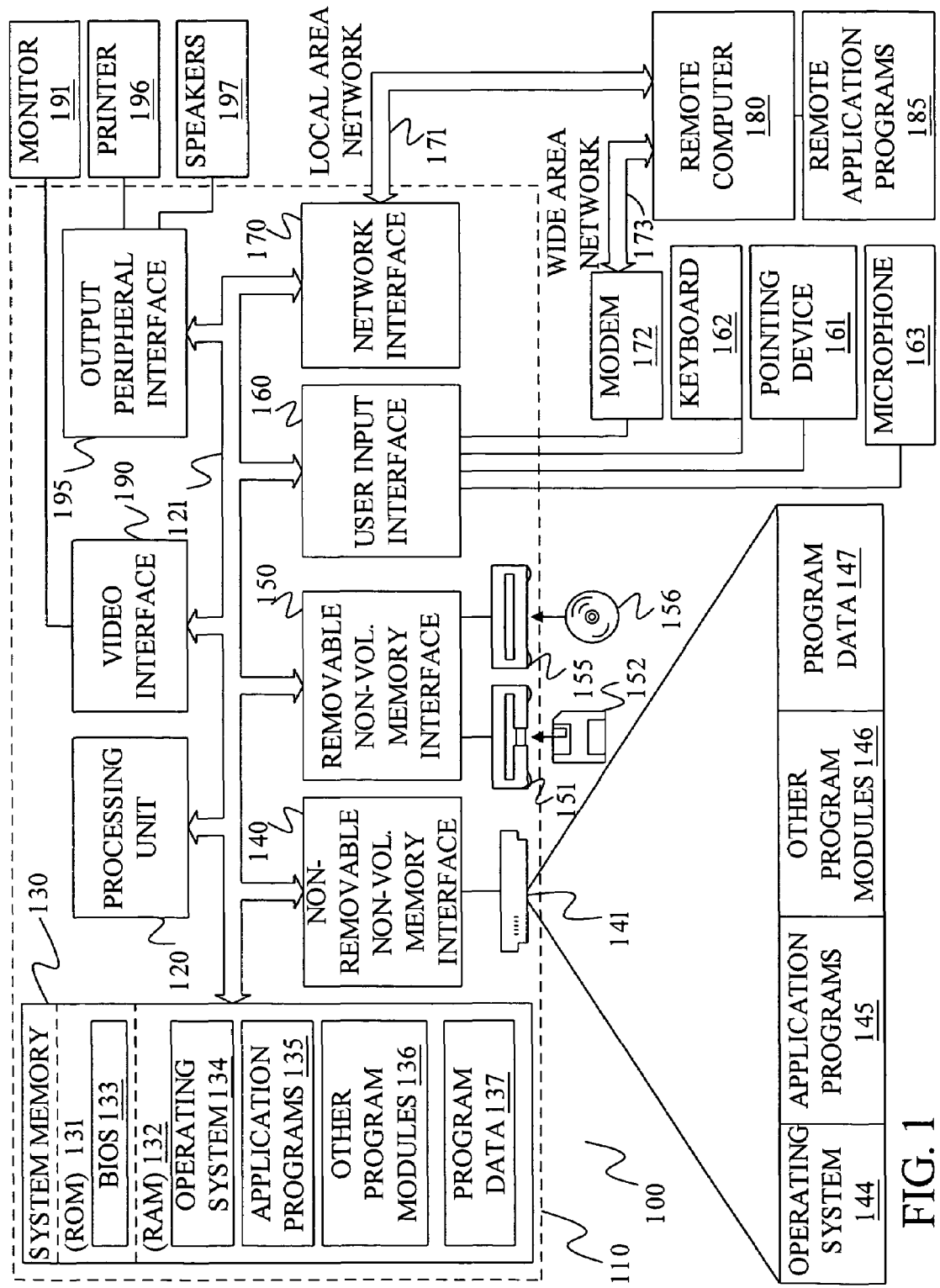
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
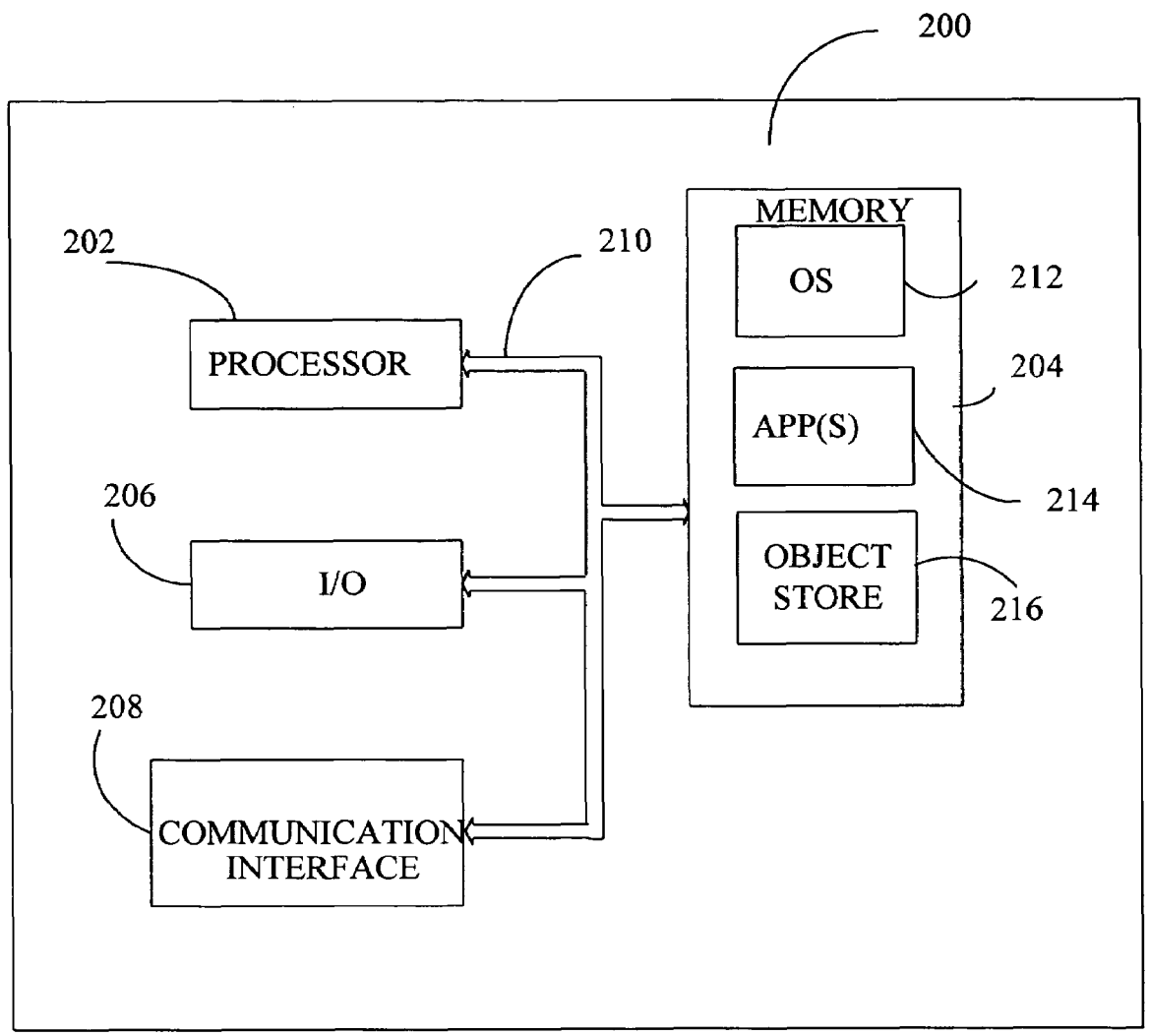
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In the past, the failure of Hidden Markov Models to perform well on speech signals with high speaking rates or with low speaking effort has often been attributed to a lack of training data for these types of speech. The present inventors, however, have discovered that it is likely that even with more training data for these types of speech, Hidden Markov Models will still not be able to recognize speech with the desired amount of accuracy. The reason for this is that at high speaking rates the static VTR patterns and hence the static acoustic information (e.g. cepstra) for different vowel sounds begin to converge if only isolated or "static" portions of the speech signal are examined when making a recognition decision.

Figure 3:
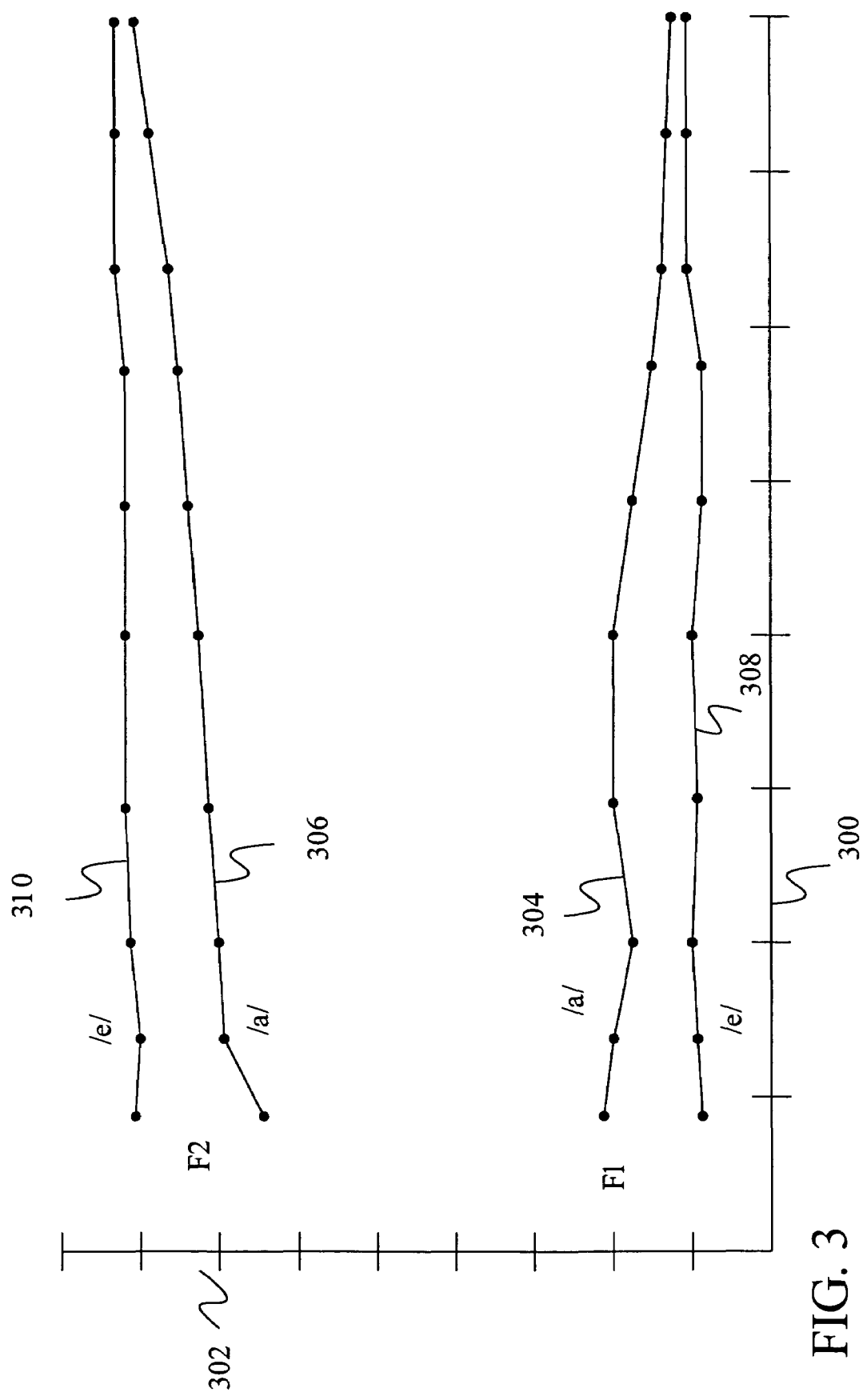
FIG. 3 provides a graph of observed VTR values for two different vowel sounds as speaking rate increases.

This convergence of the VTR values for different vowel sounds is referred to as static confusion. FIG. 3 provides a diagram showing that as the speaking rate increases, VTRs for two different vowel sounds begin to converge. In particular, in FIG. 3, the speaking rate is shown on horizontal axis 300 and the frequency of the first and second VTRs is shown on vertical axis 302. In FIG. 3, speaking rate increases from left to right and frequency increases from the bottom to the top. The value of the first VTR and the second VTR for the vowel sound /a/ are shown by lines 304 and 306, respectively. The values of the first and second VTR for the vowel sound /e/ are shown by lines 308 and 310, respectively.

As can be seen in FIG. 3, the first and second VTRs for the vowel sounds /a/ and /e/ are much more separated at lower speaking rates than at higher speaking rates. Because of this, at higher speaking rates, it is more difficult for the speech recognition system to distinguish between the /a/ sound and the /e/ sound.

The present invention provides a model for VTRs, which accurately predicts the static confusion represented by the data of FIG. 3. This model is a result of an interaction between phonetic context, speaking rate/duration, and spectral rate of changes related to the speaking style.

Under the model, a sequence of VTR targets, modeled as step functions, are passed through a finite impulse response (FIR) filter to produce a smooth continuous VTR pattern.

The FIR filter is characterized by the following non-causal impulse response function:

$$h_s(k) \begin{cases} C\gamma_{s(k)}^{-k} & -D < k < 0 \\ C & k = 0 \\ C\gamma_{s(k)}^{k} & 0 < k < D \end{cases} \quad \text{Equation 1}$$

where k represents the center of a time frame, typically with a length of 10 milliseconds, $\gamma_{s(k)}$ is a stiffness parameter, which is positive and real valued, ranging between zero and one. The s(k) in $\gamma_{s(k)}$ indicates that the stiffness parameter is dependent on the segment state s(k) on a moment-by-moment and time varying basis, and D is the unidirectional length of the impulse response.

In equation 1, k=0 represents a current time point, k less than zero represents past time points, and k greater than zero represents future time points.

Thus, in the impulse response of Equation 1, it is assumed for simplicity that the impulse response is symmetric such that the extent of coarticulation in the forward direction is equal to the extent of coarticulation in the backward direction. In other words, the impulse response is symmetric with respect to past time points and future time points. In other embodiments, the impulse response is not symmetrical. In particular, for languages other than English, it is sometimes beneficial to have a nonsymmetrical impulse response for the FIR filter.

In Equation 1, C is a normalization constraint that is used to ensure that the sum of the filter weights adds up to one. This is essential for the model to produce target "undershoot," instead of "overshoot." To compute C, it is first assumed that the stiffness parameter stays approximately constant across the temporal span of the finite impulse response such that:

$$\gamma_{s(k)} \approx \gamma \qquad \text{Equation 2}$$

Under this assumption, the value of C can be determined for a particular γ as:

$$C \approx \frac{1-\gamma}{1+\gamma-2\gamma^{D+1}} \qquad \text{Equation 3}$$

Under the model of the present invention, the target for the VTRs is modeled as a sequence of step-wise functions with variable durations and heights, which can be defined as:

$$T(k) = \sum_{i=1}^{P} \left[ u(k - k_{s_i}^l) - u(k - k_{s_i}^r) \right] x T_{s_i}, \qquad \text{Equation 4}$$

where u(k) is the unit step function that has a value of zero when its argument is negative and one when its argument is positive, $k_s^r$ is the right boundary for a segment s and $k_s^l$ is the left boundary for the segment s, $T_s$ is the target for the segment s and P is the total number of segments in the sequence.

FIG. 4 provides a graph of a target sequence 404 that can be described by Equation 4. In FIG. 4, time is shown on horizontal axis 400 and frequency is shown on vertical axis 402. In FIG. 4 there are four segments having four targets 406, 408, 410 and 412.

The boundaries for the segments must be known in order to generate the target sequence. This information can be determined using a recognizer's forced alignment results or can be learned automatically using algorithms such as those described in J. Ma and L. Deng, "Efficient Decoding Strategies for Conversational Speech Recognition Using a Constrained Non-Linear State Space Model for Vocal-Tract-Resonance Dynamics," IEEE Transactions on Speech and Audio Processing, Volume 11, 203, pages 590-602.

Given the FIR filter and the target sequence, the VTR trajectories can be determined by convolving the filter response with the target sequence. This produces a VTR trajectory of:

$$z_s(k) = h_{s(k)} * T(k) = \sum_{\tau=k-D}^{k+D} C(\gamma_{s(\tau)}) T_{s(\tau)} \gamma_{s(\tau)}^{|k-\tau|}, \qquad \text{Equation 5}$$

where Equation 5 gives a value of the trajectory at a single value of k. In Equation 5, the stiffness parameter and the normalization constant C, are dependent on the segment at time τ. Under one embodiment of the present invention, each segment is given the same stiffness parameter and normalization constant. Even under such an embodiment, however, each segment would have its own target value $T_{s(\tau)}$.

The individual values for the trajectory of the VTR can be sequentially concatenated together using:

$$z(k) = \sum_{i=1}^{P} \left[ u(k - k_{s_i}^l) - u(k - k_{s_i}^r) \right] \cdot z_{s_i}(k) \qquad \text{Equation 6}$$

Note that a separate computation of Equation 6 is performed for each VTR frequency resulting in separate VTR trajectories.

The parameters of the filter, as well as the duration of the targets for each phone, can be modified to produce many kinds of target undershooting effects in a contextually assimilated manner.

FIG. 4 shows a predicted VTR trajectory 414 developed under the model of the present invention using an FIR filter and target sequence 404 of FIG. 4. As shown in FIG. 4, the VTR trajectory is a continuous trajectory that moves toward the target of each segment. For longer length segments, the VTR trajectory comes closer to the target than for shorter segments.

FIG. 5 shows a graph of a target sequence and a resulting predicated VTR trajectory using the present model, in which the same segments of FIG. 4 are present, but have a much shorter duration. Thus, the same targets are in target sequence 504 as in target sequence 404, but each has a shorter duration. As with FIG. 4, in FIG. 5, time is shown along horizontal axis 500 and frequency is shown along vertical axis 502.

Because of the shorter duration of each segment, the predicted VTR trajectories do not come as close to the target values in FIG. 5 as they did in FIG. 4. Thus, as the duration of a speech segment shortens, there is an increase in the reduction of the VTR trajectories predicted by the present model. This agrees well with the observed reductions in VTR trajectories as speech segments shorten.

Figure 6:
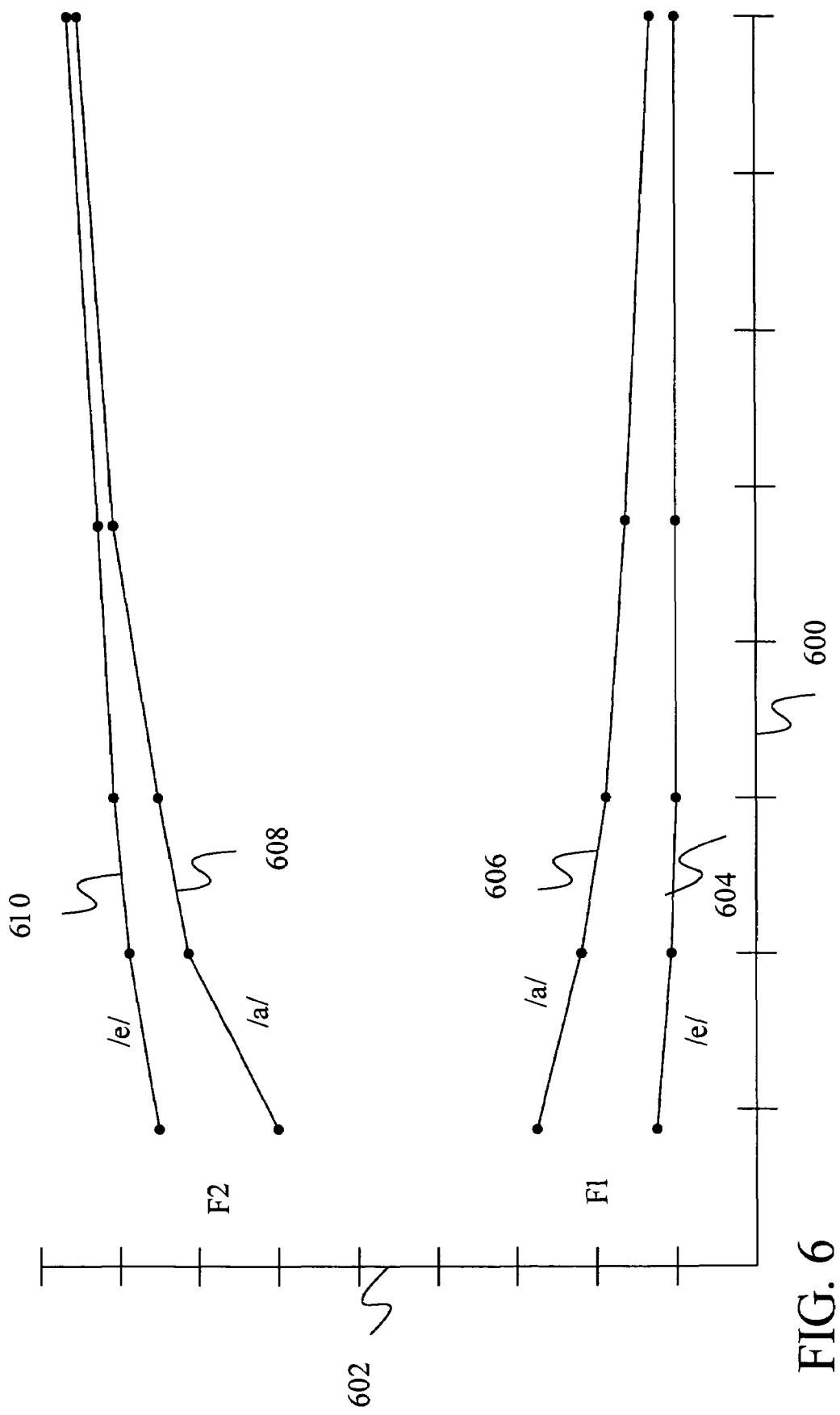
FIG. 6 provides a graph of predicted VTR values using the first VTR model of the present invention as speaking rate increases.

The predicted VTR trajectories under the present invention also predict the static confusion between phonemes that is found in the observation data of FIG. 3. In particular, as shown in FIG. 6, the FIR filter model of the present invention predicts that as speaking rates increase the values of the first and second VTRs for two different phonetic units will begin to approach each other. As in FIG. 3, in FIG. 6, speaking rate is shown along horizontal axis 600 and VTR frequency values are shown along vertical axis 602.

In FIG. 6, lines 604 and 610 show the values predicted by the model of the present invention for the first and second VTRs, respectively, of the phonetic unit /e/ as a function of speaking rate. Lines 606 and 608 show the values predicted by the model for the first and second VTRs, respectively, of the phonetic unit /a/.

As shown by FIG. 6, the predicted values for the first and second VTRs of phonetic units /e/ and /a/ converge towards each other as the speaking rate increases. Thus, the FIR filter model of the present invention generates VTR trajectories that agree well with the observed data and that suggest that static confusion between phonetic units is caused by convergence of the VTR values as speaking rates increase.

Figure 7:
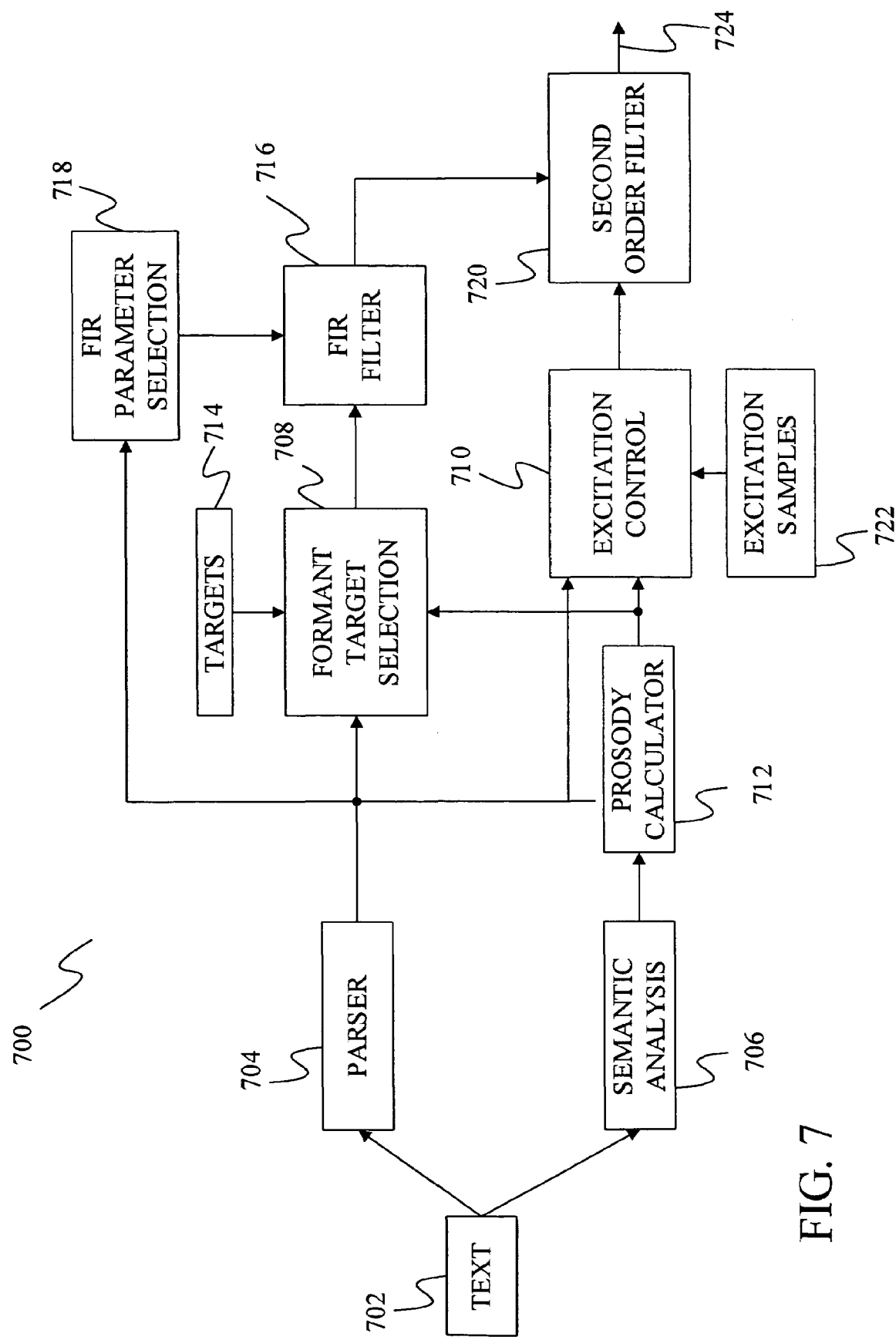
FIG. 7 is a block diagram of a speech synthesis system in which the present invention may be practiced.

The VTR trajectory model of the present invention may be used in a speech synthesis system such as speech synthesizer 700 of FIG. 7. In FIG. 7, a text 702 is provided to a parser 704 and a semantic analysis component 706. Parser 704 parses the text into phonetic units that are provided to a VTR target selection unit 708 and an excitation control 710. Semantic analysis component 706 identifies semantic features of text 702 and provides these features to a prosody calculator 712. Prosody calculator 712 identifies the duration, pitch, and loudness of different portions of text 702 based on the semantic identifiers provided by semantic analysis 706. Typically, the result of prosody calculator 712 is a set of prosody marks that are provided to excitation control 710 and VTR target selection 708.

Using the prosody marks, which indicate the duration of different sounds, and the identities of the phonetic units provided by parser 704, VTR target selection 708 generates a target sequence using a set of predefined targets 714. Typically, there is a separate set of targets 714 for each phonetic unit that can be produced by parser 704, where each set targets includes a separate target for each of four VTRs.

The output of VTR target selection 708 is a sequence of targets similar to target sequence 404 of FIG. 4, which is provided to a finite impulse response filter 716. The impulse response of finite impulse response filter 716 is defined according to Equation 1 above. Under some embodiments, the response is dependent on the particular phonetic units identified by parser 704. In such cases, the response of the filter is set by an FIR parameter selection unit 718, which selects the parameters from a set of stored finite impulse response parameters based on the phonetic units identified by parser 704.

The output of FIR filter 716 is a set of VTR trajectories, which in one embodiment includes trajectories for four separate VTRs. These VTR trajectories are provided to a second order filter 720.

Excitation control 710 uses the phonetic units from parser 704 and the prosody marks from prosody calculator 712 to generate an excitation signal, which, in one embodiment, is formed by concatenating excitation samples from a set of excitation samples 722. The excitation signal produced by excitation control 710 is passed through second order filter 720, which filters the excitation signal based on the VTR trajectories identified by FIR filter 716. This results in synthesized speech 724.

As noted earlier, the model for VTRs, described by Equations 4 through 6, relatively accurately predicts the static confusion represented by the data of FIG. 3, for example, and therefore is useful in speech synthesis systems, such as the system shown in FIG. 7. However, the above model for VTRs (hereinafter referred to as the first model) does not take into account randomness (or variability) in the VTR targets. Thus, when used in speech recognition systems, for example, it is best suited to help recognize speech from a fixed speaker.

A second model for VTR dynamics, described below by Equations 7 through 10, removes the above-noted assumption and instead treats VTR targets as random variables. The development of the second model begins with the characterization of the VTR randomness in terms of its statistical distribution. For simplification, equations included below utilize Gaussian distributions to characterize VTR randomness. However, any suitable distribution may be utilized to characterize randomness in the VTR, without departing from the scope and spirit of the present invention. In the second model, for each gender (not denoted here for simplicity) and for each segment s, a separate Gaussian distribution for the target is assumed, and defined as:

$$p(T|s) = N(T; \mu_{T_s}, \sigma_{T_s}^2) \quad \text{Equation 7}$$

where $\mu_{T_s}$ is a mean of the target T and $\sigma_T^2$ is a variance of the target T.

FIG. 8, which is similar to FIG. 4, provides a graph of an example target sequence 804 that can be described by using the distribution (Equation 7) to define each segment of target sequence 804. As with FIG. 4, time is shown on horizontal axis 800 and frequency is shown on vertical axis 802. In FIG. 8, as in the case of FIG. 4, there are four segments having four targets 806, 808, 810 and 812. Each target 806, 808, 810, 812 is a distribution, which is represented by multiple dashed lines in FIG. 8.

Given a sampled target sequence $T_{s(k)}$, in a form defined by Equation 7, and the FIR filter, the corresponding random VTR trajectory z(k) can be determined, in a form similar to that described by Equation 5, by convolving the FIR filter response with the target sequence. Hence, a Gaussian distribution (gender-specific) for VTR trajectory z(k) is:

$$p(z(k)|s) = N[z(k); \mu_z(k), \sigma_z^2(k)] \quad \text{Equation 8}$$

where $$\mu_z(k) = \sum_{\tau=k-D}^{k+D} c(\gamma_{s(\tau)}) \mu_{T_{s(\tau)}} \gamma_{s(\tau)}^{|k-\tau|} \quad \text{Equation 9}$$

and $$\sigma_z^2(k) = \sum_{\tau=k-D}^{k+D} c^2(\gamma_{s(\tau)}) \sigma_{T_{s(\tau)}}^2 \gamma_{s(\tau)}^{2|k-\tau|}, \quad \text{Equation 10}$$

where $\mu_z(k)$ is a mean of VTR trajectory z(k), $\sigma_z^2(k)$ is a variance of VTR trajectory z(k), $\mu_{T_{s(\tau)}}$ is a mean of a VTR target for segment s at time τ and $\sigma_{T_{s(\tau)}}^2$ is a variance of a VTR target for segment s at time τ.

In the second model, individual distributions of the VTR trajectory are sequentially concatenated together in a manner similar to that described above in connection with Equation 6 of the first model.

As mentioned above, the parameters of the filter, as well as the duration of the targets for each phone, can be modified to produce many kinds of target undershooting effects in a contextually assimilated manner.

FIG. 8 shows a predicted VTR trajectory 814 developed under the second model using an FIR filter and target sequence 804 of FIG. 8. As shown in FIG. 8, the VTR trajectory is a continuous distribution that moves toward the target of each segment. However, it should be noted that this continuous trajectory (represented by multiple dashed lines in FIG. 8) is formed of a sequence of distributions, each distribution is computed based on a different one of targets 806, 808, 810 and 812. As noted earlier, for longer length segments, the VTR trajectory comes closer to the target than for shorter segments.

Trajectory distribution 814 has a time-varying variance such that the variance (shown as the vertical spread of trajectory distribution 814 in FIG. 8) is different at different points in time. As shown by Equation 10, the value of the variance of the trajectory at any point in time is a function of the variance of past targets and the variance of future targets in the sequence of targets as well as the stiffness parameters associated with the segments.

FIG. 9 shows a graph of a target sequence and a resulting predicated VTR trajectory using the second model, in which the same segments of FIG. 8 are present, but have a much shorter duration. Thus, the same targets are in target sequence 904 as in target sequence 804, but each has a shorter duration. As with FIG. 8, in FIG. 9, time is shown along horizontal axis 900 and frequency is shown along vertical axis 902.

As mentioned above, because of the shorter duration of each segment, the predicted VTR trajectories do not come as close to the target values in FIG. 9 as they did in FIG. 8. Thus, as the duration of a speech segment shortens, there is an increase in the reduction of the VTR trajectories predicted by the second model. This agrees well with the observed reductions in VTR trajectories as speech segments shorten. Also, the variance of the trajectory does not change as much for the shorter speech segments, but instead stays within a smaller range of variances.

In the second model, VTR target means $\mu_{T_s}$ and variances $\sigma_{T_s}^2$ are estimated using sample statistics for empirically estimated VTR targets for each of multiple speakers in a training set.

The second VTR model can be utilized in a speech synthesis system in a manner similar to the first model. However, when the second model is utilized, speech excitation system 700 will employ targets defined by Equation 7 instead of by Equation 4.

Further, the embodiments described above for both VTR models are useful in developing speech recognition systems. It should be noted the first VTR model (defined by Equations 4 through 6) and the second VTR model (defined by Equations 7 through 10) constitute two different embodiments of a first stage (Stage I) of a two-stage hidden trajectory model (HTM) for structured speech. Two alternative approaches for implementing a second stage (Stage II) of the two-stage HTM (one using the output provided by the first VTR model (a cascaded approach) and the other an extension of the second VTR model (an integrated approach)).

In the first implementation of the second stage of the HTM, the VTR vector z(k) at each time frame k is converted into a corresponding vector of linear predictive coding (LPC) cepstra o(k). Thus, the smooth dynamic pattern of z(k), output from the first VTR model, is mapped to a dynamic pattern of o(k), which is typically less smooth, reflecting quantal properties in speech production. The mapping, as has been implemented, is in a memory-less fashion (i.e., no temporal smoothing), and is statistical rather than deterministic.

To describe this mapping function, the VTR vector has been decomposed into a set of K resonant frequencies $f=(f_1, f_2, \ldots, f_k)'$ and bandwidths $b=(b_1, b_2, \ldots, b_k)'$, and $z=(f\ b)'$. Then the statistical mapping from VTR to cepstrum, which constitutes one approach for implementing the second stage of the HTM, is represented by $$o(k)=F(z_s(k))+\mu_{r_s}+v_s(k) \quad \text{Equation 11}$$

where $v_s(k)$ is a sub-segment-dependent, (for notational simplicity, the label s is used to denote a segment as well as for a sub-segment) zero-mean Gaussian random vector: $v_s \sim N(v; 0, \sigma_{r_s}^2)$, and $\mu_{r_s}$ is a subsegment-dependent bias vector for the nonlinear predictive function $F(z_s)$. A subsegment of a phone is defined to be a consecutive temporal portion of the phone segment. Linear concatenation of several subsegments constitutes a phone segment. In Equation 11, the output of the mapping function F(z) has the following parameter-free, analytical form for its n-th vector component (i.e., n-th order cepstrum):

$$F_n(k) = \frac{2}{n}\sum_{p=1}^{P} e^{-\pi n \frac{b_p(k)}{f_s}} \cos\left(2\pi n \frac{f_p(k)}{f_s}\right) \quad \text{Equation 12}$$

where $f_s$ is the sampling frequency, and P is the highest VTR order.

Figure 10:
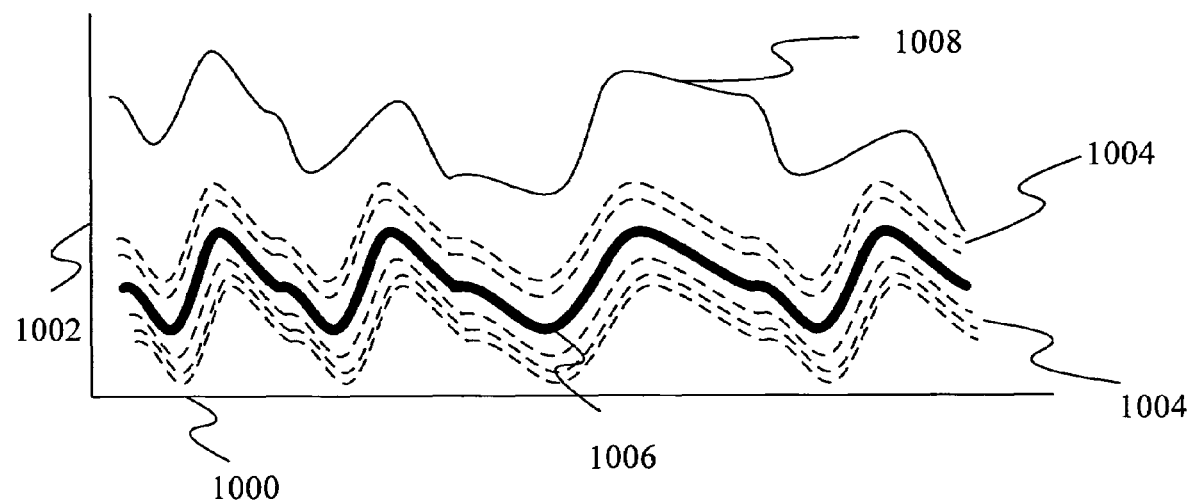
FIG. 10 provides a graph of cepstra produced using a first approach for HTM speech recognition.

FIG. 10 provides an illustrative graph of a distribution 1004 of an nth order of cepstrum (represented by dashed lines) that can be described by Equations 11 and 12. In FIG. 10, time is shown on horizontal axis 1000 and magnitude is shown on vertical axis 1002. A mean of distribution 1004 is represented by reference numeral 1006 and a cepstrum obtained from a speech signal is represented by reference numeral 1008.

As described above in connection with Equations 11 and 12, the first approach for implementing the second stage of the HTM involves converting the VTR trajectory output by the first VTR model (defined by Equations 4 through 6) into cepstra. However, the second approach (defined by Equations 7 through 10) utilizes outputs from the second VTR model and therefore needs to account for uncertainty in VTR dynamics. Thus, in the second approach, there is a need to characterize cepstrum uncertainty in terms of its conditional distribution on the VTR, and to simplify the distribution to a computationally tractable form. That is, there is a need to specify and approximate p(o|z,s). The first approach is described below in connection with FIGS. 11 and 12, which are discussed together.

Figure 11:
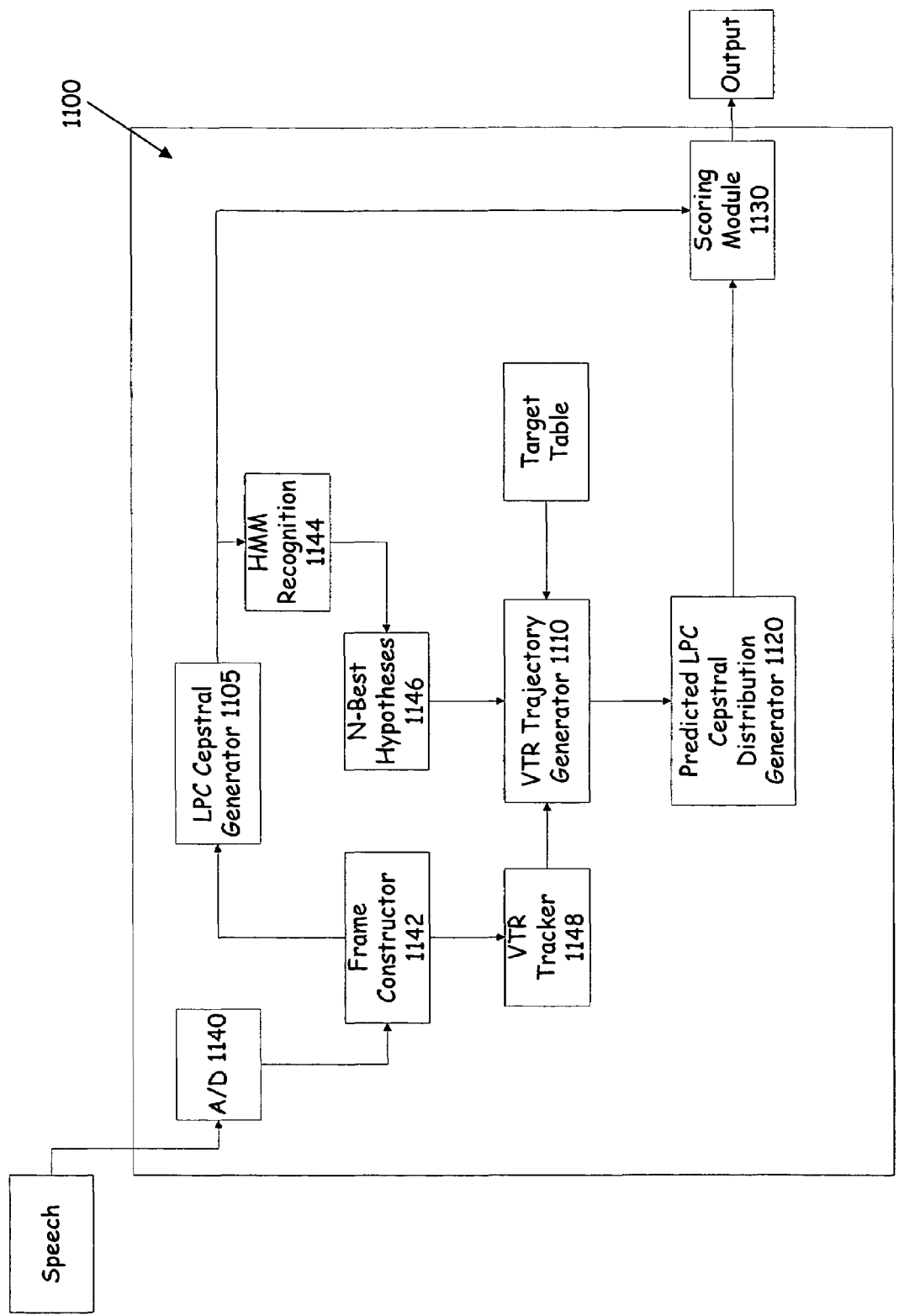
FIG. 11 is a block diagram illustrating an exemplary speech recognizer according to one embodiment of the present invention.

FIG. 11 is a block diagram illustrating the components of a speech recognizer 1100 in which the models of the present invention can be used. Speech recognizer 1100 includes an analog-to-digital converter 1140, a frame constructor 1142, a LPC cepstral generator 1105, an HMM recognition unit 1144, a VTR tracker 1148, a trajectory generator 1110, a LPC cepstral prediction generator 1120, and a scoring module 1130.

Figure 12:
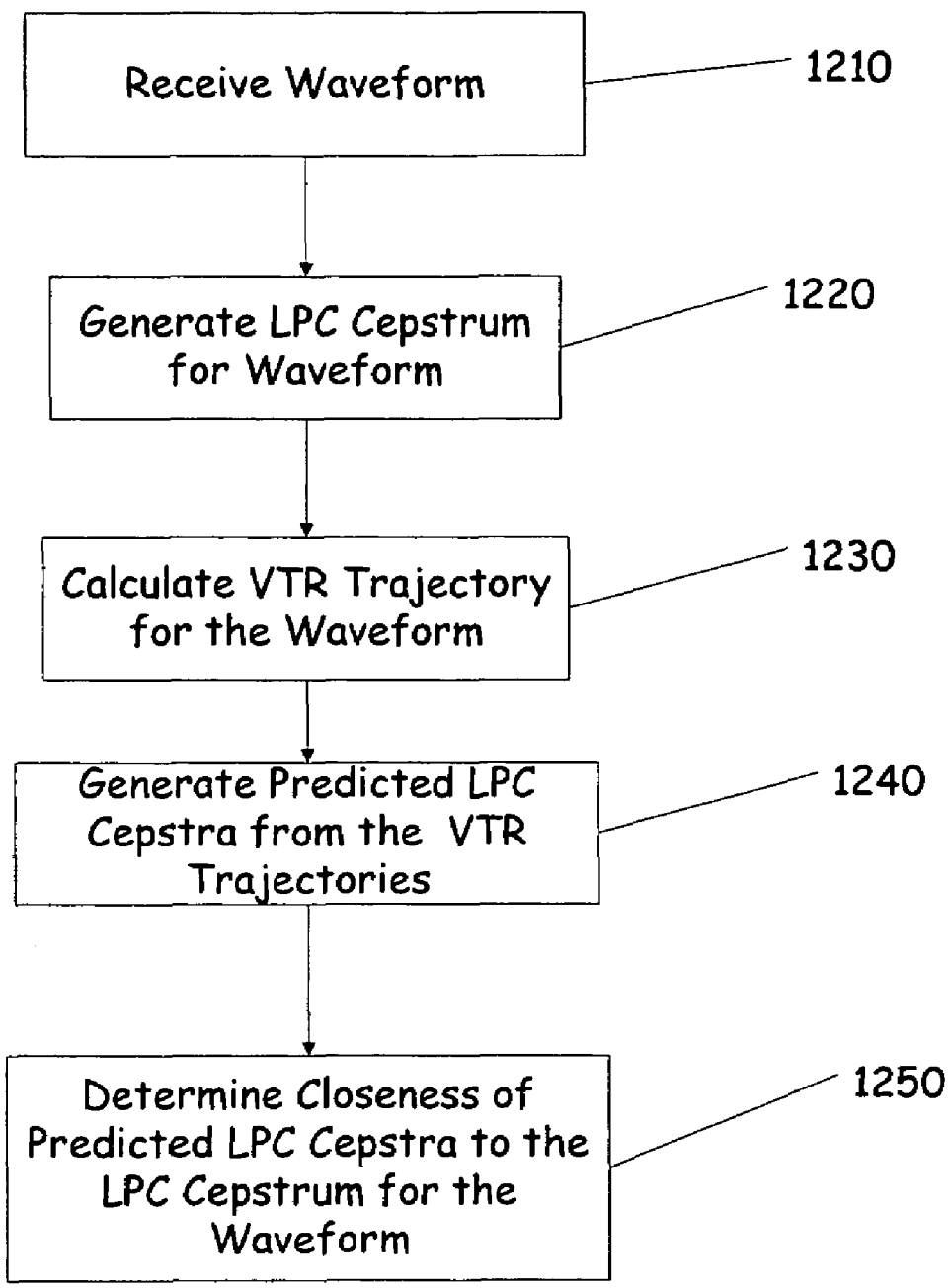
FIG. 12 is a flow diagram illustrating the steps associated with identifying a matching LPC cepstra.

FIG. 12 is a flow diagram illustrating the two-stage cascaded implementation of the coarticulation and reduction model discussed above. For purposes of this discussion the variability in the VTR dynamics in the prediction of cepstrum dynamics are ignored. This process significantly simplifies the application of the model as a phonetic recognizer. That is, given any phone sequence with possible phone segmentation such as derived from an N-best hypotheses, the deterministic VTR trajectories are generated by the trajectory generator. Feeding the VTR trajectories into a probabilistic nonlinear LPC cepstral generator, a likelihood can be computed using the Gaussian assumption of the cepstral residual. This scoring mechanism allows the recognizer to perform N-best rescoring in a straightforward manner.

First a waveform representative of speech is received by the recognizer. This is illustrated at step 1210. The waveform may be generated from human speech, or may be provided from a data file such as a TIMIT (Texas Instruments—Massachusetts Institute of Technology) database or other databases can be used.

This speech signal 1150 is sampled by analog-to-digital converter 1140 and converted into digital values. For example the received waveform can be representative of the utterance "He has never, himself, done anything for which to be hated—which of us has?" The digital values are provided to a frame constructor 1142, which groups the digital values into overlapping windows. The frames of digital values are provided to LPC Cepstral Generator 1105, which generates a LPC cepstral feature vector for each frame of the speech waveform using any known technique, typically involving identifying peaks in the spectrum of the frame of speech. This is illustrated at step 1220.

The LPC cepstral feature vectors are provided to HMM recognition unit 1144, which applies an acoustic Hidden Markov Model to the sequence of feature vectors to identify N-Best hypotheses 1146 for phonetic sequences that can be represented by the speech signal. Each hypothesis includes an alignment between the frames and the phonetic units of the hypothesis.

For each hypothesized sequence of phonetic units, VTR trajectory generator 1110 generates a VTR trajectory using the sequence of VTR targets associated with the hypothesized sequence of phonetic units. To begin this process, any compound phones in the sequence are broken into their constituents. Initial target values for the individual phones are then retrieved based on limited context dependency by table lookup. Next automatic and iterative target adaptation is performed for each phone-like unit based on the difference between the results of a VTR tracker and the VTR prediction from the FIR filter model. This is illustrated at step 1230.

Figure 13:
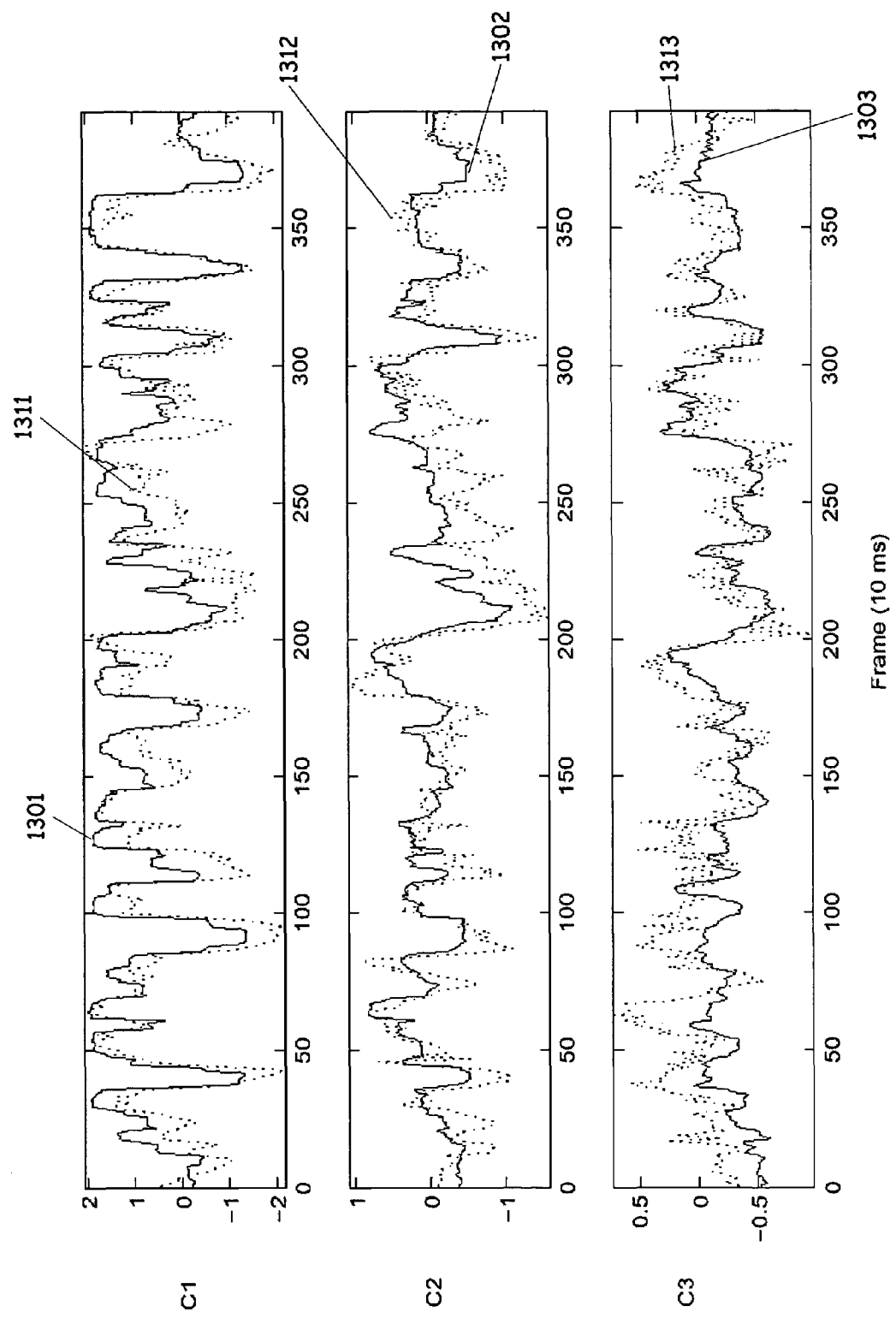
FIG. 13 is a graph illustrating a predicted LPC cepstra versus the actual LPC cepstra.

In this embodiment a single target value for each segment is used, and the VTR trajectory is calculated using equations 1-6 above. The VTR trajectory or distribution of VTR trajectories produced by VTR trajectory generator 1110 is provided to LPC cepstral prediction generator 1120, which generates predictions of the LPC cepstral feature vectors based upon the trajectories or distributions of trajectories generated by the trajectory generator 1110. This is illustrated at step 1240. A single VTR trajectory is provided to LPC cepstral prediction generator 1120, a single LPC cepstral feature vector is produced using Equations 11 and 12 above. FIG. 13 illustrates the predicted LPC cepstra for the example input. For purposes of clarity only LPC cepstra with orders one, two and three are illustrated. These orders are represented by reference numbers 1301, 1302 and 1303 respectively. Dashed lines 1311, 1312 and 1313 represent the cepstral data computed directly from the waveform at step 1220.

Following the generation of the LPC cepstra for the VTR trajectory the recognizer identifies the relative closeness (or probability) of the predicted LPC cepstra with the LPC cepstra generated from the waveform. This is illustrated at step 1250. The recognizer according to one embodiment of the present invention is based on the N-best re-scoring paradigm. At this step the recognizer subtracts the nonlinear prediction of LPC cepstra, according Equation 12 from the LPC cepstral data generated from the original waveform.

Scoring module 1130 receives the predicted LPC cepstral feature vectors or the distribution parameters for the LPC cepstral feature vectors from the generator 1120 and the LPC cepstral feature vectors for the speech waveform from the generator 1105 and generates a score based on the amount of similarity between the speech signal's feature vector and the predictions for the LPC feature vector produced by generator 1120. In particular, for embodiments where a single predicted LPC cepstral feature vector is provided, a cascade scoring technique is used.

In the cascaded implementation, it is assumed that given segment s, there is no variability in the VTR targets for a fixed speaker and consequently there is no variability in the VTR variable z in each frame within the segment. (Such variability is absorbed into the random component in the first implementation of the second stage of the HTM (Equations 10 and 11). That is, both z and T are treated as deterministic instead of random variables. Hence, it follows that $p(z|s)=1$ for $z=z_{max}$ as generated from the FIR filter, and $p(z|s)=0$ otherwise. Segment-dependent and speaker specific targets $T_s$ in the training data are obtained by an iterative adaptative algorithm that adjusts $T_s$ so that the FIR output from Equation 5 matches, with minimal errors, the automatically tracked VTR produced from the algorithm described in L. Deng, I. Bazzi, and A. Acero. "Tracking Vocal Tract Resonances Using an Analytical Nonlinear Predictor and a Target Guided Temporal Constraint," Proc. Eurospeech, 2003, pp. 73-76. For the test data, targets are estimated using an algorithm similar to vocal tract length normalization techniques.

To compute the acoustic likelihood required for scoring in recognition, the above stage-I output $z=z_{max}$ as the deterministic signal, is passed to LPC generator 1120 to produce the cepstral prediction $F(z_{max}(k))$ on a frame-by-frame basis, where each component of $F(z_{max}(k))$ is calculated using equation 12 above. For each frame of the observed cepstral vector o(k) within each segment s (or subsegment), the approximate likelihood score is defined as:

$$p(o(k)|s) \approx \max p(o(k)|z(k), s)p(z(k)|s) \approx$$
$$p(o(k)|z_{max}(k), s)p(z_{max}(k)|s) =$$
$$p(o(k) | z_{max}(k), s) = N[o(k); F(z_{max}(k)) + \mu_{r_s}, \sigma^2_{r_s}]$$

Equation 13

This Gaussian likelihood computation is done directly using the HTK's forced-alignment tool (Hvite) for a series of N-best rescoring experiments described further below.

In the embodiment that calculates the difference this difference is calculated separately for each of the N-best hypotheses computed from a state-of-the-art triphone Hidden Markov Model, and forms the residual sequence that follows a monophone Hidden Markov Model. In one embodiment the recognizer uses an HTK tool (Hvite) to directly compute the likelihood for the residual sequence. However other tools can be used. The results of this set of computations are re-ranked as the recognizer's final output.

One aspect of the recognizer design of the present invention is to naturally incorporate the delta and acceleration features into the recognizer. One feature of the present invention is to decompose LPC cepstral feature differentials (delta and acceleration) into a component that can be predicted from the VTR, according to Equation 12, and a component that cannot be predicted i.e., the residuals $\mu_{ss}+v_{ss}(k)$ of Equation 11. For the predictable component, the present invention directly computes the frame differentials of the predicted LPC cepstral values. For the unpredictable component, the present invention trains the delta and acceleration parameters of means and variances for the residuals using the corresponding frame-differential LPC cepstral training data. One advantage of this technique for treating delta and acceleration features is that in the degenerative case where the predictive model component of equation 12 is removed by setting it to zero, the recognizer automatically becomes a conventional (monophone) Hidden Markov Model system.

To compute the residual likelihood at step 1250 the present invention requires that residual means and variances of each substate of each phone in the N-best hypotheses are known. The training of recognizer 1100 follows a similar process as that used for recognition and disclosed above with respect to FIG. 12, except that the step of rescoring the results is omitted. In one embodiment the parameters are trained from the TIMIT training set. However, other training sets can be used. In this embodiment a two-stage acoustic model using a standard 61 label set, which are folded into 48 classes, is used in training the residual means and variances for each subsegment of each class. VTR targets are trained and then adapted for each phone segment instead of sub segment. For diphthongs and affricates, two separate targets are trained, assuming one target following another. Again, as in FIG. 12, given the training script, including both phone sequences and phone boundaries, trajectory generator 1110 generates deterministic VTR trajectories, and LPC cepstral predictor 1120 generates predicted cepstral trajectories from the VTR trajectories. The scoring module 1130 subtracts the predicted cepstral trajectories from the cepstral training data on a frame-by-frame basis giving residuals for the training set. Treating these residuals as the "training data", an HTK tool is applied to train a set of residual monophones Hidden Markov Models. The mean and variance parameters of these models are then used for N-best rescoring.

As described above, the cascaded implementation assumes that, for a given segment s, there is no variability/uncertainty in the VTR targets for a fixed speaker and consequently there is no variability/uncertainty in the VTR variable z in each frame within the segment. However, the integrated implementation, described below, takes into consideration variability/uncertainty in the VTR targets and the VTR variable z. This variability makes it impossible to know the trajectory with any certainty given the segment. As such, the trajectories must be integrated (marginalized) out of the likelihood calculation.

For embodiments where a distribution of VTR trajectories is provided, parameters representing a distribution of LPC Cepstral feature vectors are produced using the following equation:

$$p(o(k)|z(k),s) = N[o(k); F[z(k)] + \mu_{r_s}, \sigma_{r_s}^2] \qquad \text{Equation 14}$$

For computational tractability in marginalization, there is a need to linearize the nonlinear mean function of F[z(k)] in Equation 14. This can be carried out by using the following first-order Taylor series approximation to the nonlinear mean function:

$$F[z(k)] \approx F[z_o(k)] + F'[z_0(k)](z(k) - z_0(k)), \qquad \text{Equation 15}$$

where the components of the Jacobian above (n-th order cepstrum's derivative with respect to the pth component of VTR z) are:

$$F'_n[f_p(k)] = -\frac{4\pi}{f_s} e^{-\pi n \frac{b_p(k)}{f_s}} \sin\left(2\pi n \frac{f_p(k)}{f_s}\right) \qquad \text{Equation 16}$$

for the pth VTR frequency component of z, and $$F'_n[b_p(k)] = -\frac{2\pi}{f_s} e^{-\pi n \frac{b_p(k)}{f_s}} \cos\left(2\pi n \frac{f_p(k)}{f_s}\right) \qquad \text{Equation 17}$$

for the pth VTR bandwidth components of z. In the current implementation, the expansion point $z_0(k)$ in Equation 15 is fixed to be the output of the second VTR model of the HTM, rather than being iteratively updated.

Substituting Equation 15 into Equation 14, the approximate conditional acoustic observation probability is obtained where the mean $\mu_{o_s}$ is expressed as a linear function of the VTR variable z:

$$p(o(k)|z(k),s) \approx N[o(k); \mu_{o_s}(k), \sigma_{r_s}^2] \qquad \text{Equation 18}$$

where $$\mu_{o_s}(k) = F[z(k)] + \mu_{r_s}$$
$$= F'[z_o(k)]z(k) + B_s \qquad \text{Equation 19}$$

where $$B_s = F[z_0(k)] + \mu_{r_s} - F'[z_0(k)]z_0(k). \qquad \text{Equation 20}$$

This permits a closed-form solution for acoustic likelihood computation, for example, which is described further below.

Give the above results, the integration/marginalization over the random VTR variable z in computing the acoustic likelihood can be proceeded analytically as follows:

$$p(o(k)|s) = \int p(o(k)|z(k),s)p(z(k)|s)dz \approx \qquad \text{Equation 21}$$

$$\int N[o(k); F'[z_o(k)]z(k) + B_s, \sigma_{r_s}^2] \times$$

$$N[z(k); \mu_z(k), \sigma_z^2(k)]dz =$$

$$\int N[F'[z_o(k)]z(k); o(k) - B_s, \sigma_{r_s}^2] \times$$

$$N[z(k); \mu_z(k), \sigma_z^2(k)]dz =$$

$$\int N[F'[z_o(k)]; o(k) - B_s, \sigma_{r_s}^2] \times N[z(k), \sigma_z^2(k)]dz =$$

$$N[o(k) - B_s; F'[z_0(k)] \times \mu_z(k), \sigma_{r_s}^2 + (F'[z_0(k)])^2 \sigma_z^2(k)] =$$

$$\frac{(2\pi)^{-0.5}}{\sqrt{\sigma_{r_s}^2 + (F'[z_0(k)])^2 \sigma_z^2(k)}} \exp\left\{-\frac{(o(k) - B_s - F'[z_0(k)]\mu_z(k))^2}{2[\sigma_{r_s}^2 + (F'[z_0(k)])^2 \sigma_z^2(k)]}\right\} =$$

$$\frac{(2\pi)^{-0.5}}{\sqrt{\sigma_{r_s}^2 + (F'[z_0(k)])^2 \sigma_z^2(k)}} \exp\left\{-\frac{(o(k) - \bar{\mu}_{o_s}(k))^2}{2[\sigma_{r_s}^2 + (F'[z_0(k)])^2 \sigma_z^2(k)]}\right\}$$

where the (time-varying) mean of this Gaussian distribution $$\bar{\mu}_{o_s}(k) = \mu_{o_s}|z(k)\mu_z(k) = F'[z_0(k)]\mu_z(k) + B_s \qquad \text{Equation 22}$$

is the expectation of $\mu_{o_s}(k)$ over z(k) (i.e., when the VTR random variable z(k) is replaced by its mean $\mu_z(k)$). The final result of Equation 21 is intuitive. For example, when the Taylor series expansion point is set at $z_0(k) = \mu_z(k)$, Equation 22 is simplified to $\bar{\mu}_{o_s}(k) = F[\mu_z(k)] + \mu_{r_s}$, as the noise-free part of prediction. Also, the variance in Equation 21 is increased by a quantity of $(F'[z_0(k)])^2 \sigma_z^2(k)$ compared with the corresponding variance $\sigma_{r_s}^2$ in the cascaded implementation. This magnitude of increase reflects the newly introduced uncertainty in the hidden variable, measured $\sigma_z^2(k)$ as computed from Equation 9. The variance amplification factor $(F'[z_o(k)])^2$ results from the local "slope" in the nonlinear function F(z) which maps from VTR z(k) to cepstrum o(k). It should be noted that in Equation 21, the variance changes dynamically as a function of time frame, instead of as a function of segment as in the conventional Hidden Markov Model.

Figure 14:
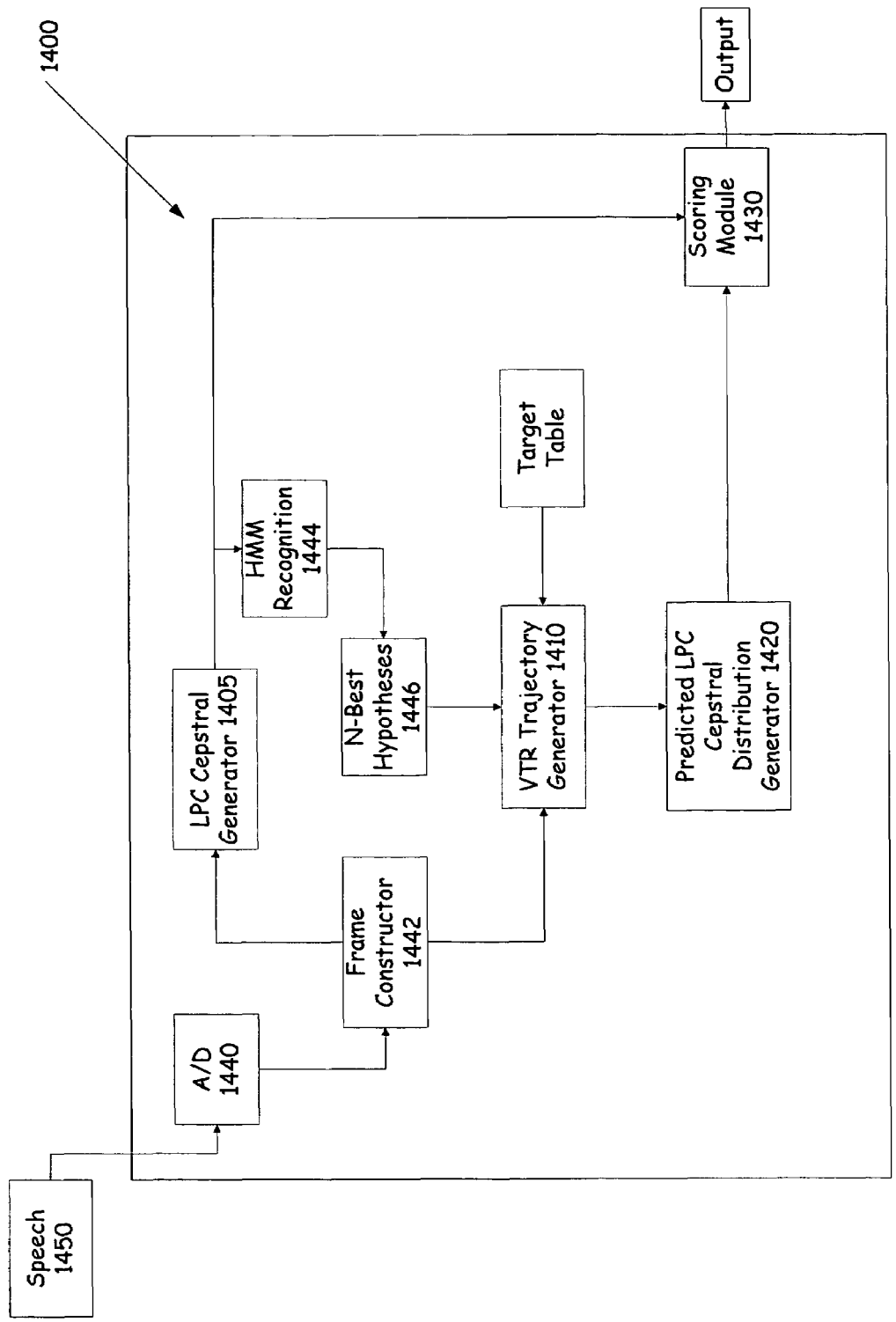
FIG. 14 is a block diagram illustrating an exemplary speech recognizer according to a second embodiment of the present invention.

FIG. 14 is a block diagram illustrating the components of a speech recognizer 1400 according to one embodiment of the integrated approach of the present invention. Speech recognizer 1400 includes an analog-to-digital converter 1440, a frame constructor 1442, a LPC cepstral generator 1405, an HMM recognition unit 1444, a trajectory generator 1410, a LPC cepstral prediction generator 1420, and a scoring module 1430. Thus, speech recognizer 1400 includes components similar to that of speech recognizer 1100 (FIG. 11), but does not include a VTR tracker.

A speech signal 1450 is sampled by analog-to-digital converter 1140 and converted into digital values. The digital values are provided to a frame constructor 1442, which groups the digital values into overlapping windows. The frames of digital values are provided to LPC Cepstral Generator 1405, which generates a LPC cepstral feature vector for each frame of the speech waveform using any known technique, typically involving identifying peaks in the spectrum of the frame of speech. It should be noted that embodiments of the integrated approach use a distribution of target values for each segment, a distribution of VTR trajectories is calculated using equations 8-10 above. Computations are carried out by the components of FIG. 14 in a manner similar to those carried out by the components of FIG. 11. However, the components of FIG. 14 carry out these computations based on Equations 14-22.

Figure 15:
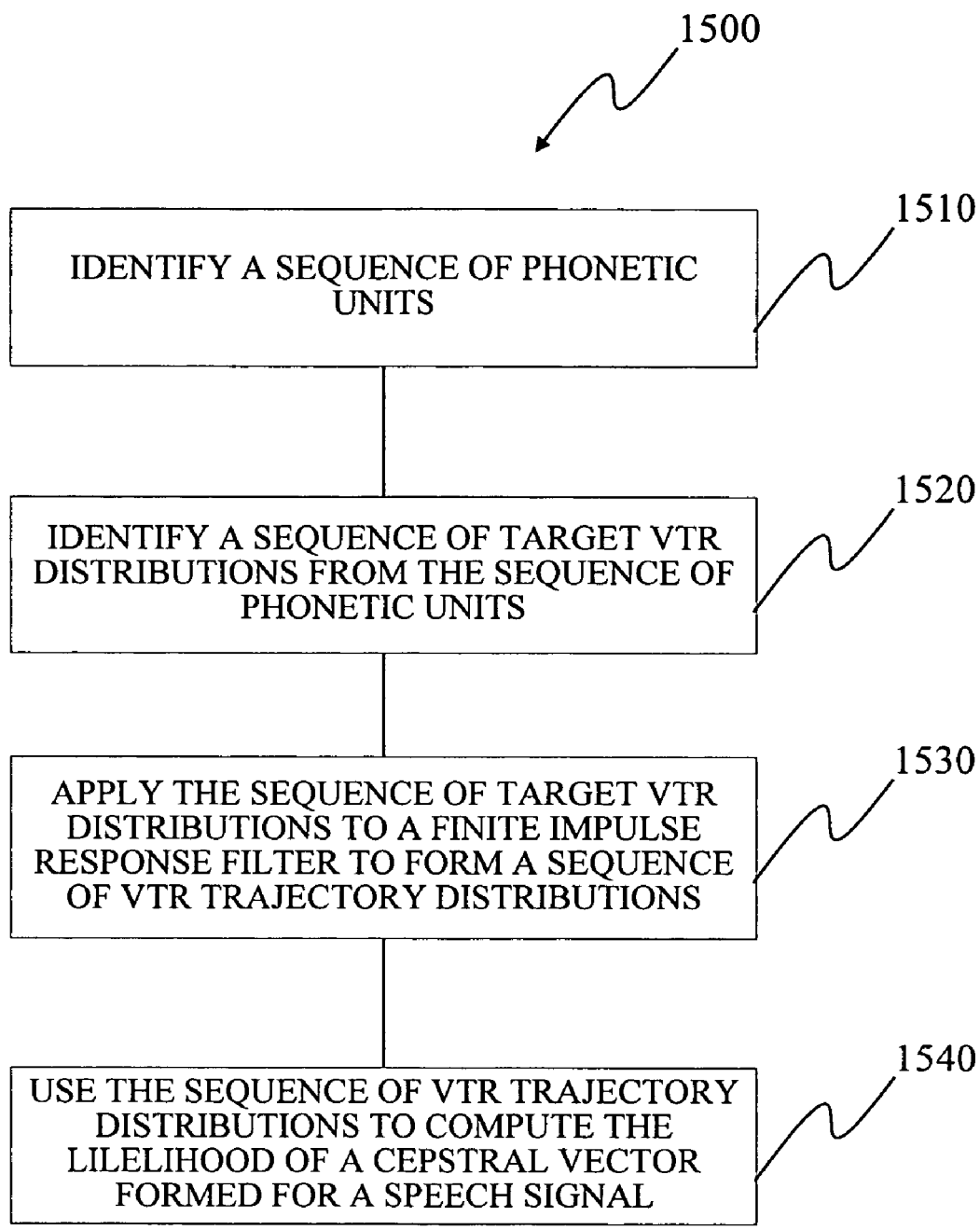
FIG. 15 is a flowchart of an integrated speech recognition embodiment of the present invention.

FIG. 15 is a flowchart 1500 of an integrated implementation of a speech recognition system. At step 1510, a sequence of phonetic units is identified for a speech signal. At step 1520, a sequence of target VTR distributions is identified from the sequence of phonetic units. At step 1530, the sequence of target VTR distributions is applied to a finite impulse response filter to form a sequence of VTR trajectory distributions. At step 1540, the sequence of VTR trajectory distributions are used to compute the likelihood of each of a sequence of cepstral vectors formed for frames of the speech signal. As mentioned above, multiple iterations of the above method are carried out to determine which plausible hypothesis of the plurality of plausible hypotheses best represents an utterance corresponding to the speech signal. Different techniques, some of which are set forth above, can be employed to carry out the steps shown in the flowchart of FIG. 15 while maintaining substantially the same functionality without departing from the scope and spirit of the present invention.

Figure 16:
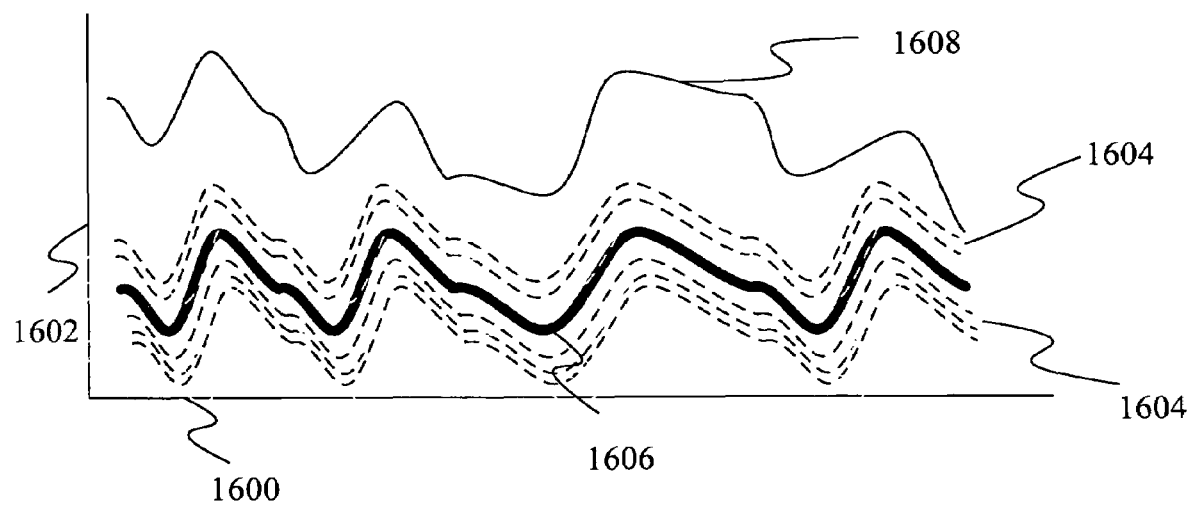
FIG. 16 provides a graph of cepstra produced using a second approach for HTM speech recognition.

FIG. 16 provides an illustrative graph of a distribution 1604 of a cepstrum (represented by dashed lines) that can be described by Equation 18. A marginalized cepstrum 1606 obtained from Equation 21 and a cepstrum obtained from a speech signal 1608 are shown. A comparison of these two cepstra provides a degree of similarity between the speech signal (reference phone signal) and the plausible hypothesis from which the marginalized cepstrum 1006 was produced.

As mentioned above, in the cascaded implementation, the parameters of the cepstral prediction residuals, $\mu_s$ and $\sigma_{r_s}^2$, are trained using the standard Baum-Welch algorithm (HTK tool for monophones) on the prediction residual signals. It can be easily shown that this gives maximum likelihood (ML) parameter estimates for the likelihood function of Equation 11. However, in the integrated implementation, where the likelihood function is in the form of Equation 21, a new training technique is required, which has been developed by the inventors and is described below.

For maximum-likelihood training of residual means, the following is set $$\frac{\partial \log \prod_{k=1}^{K} p(o(k)|s)}{\partial \mu_{r_s}} = 0, \qquad \text{Equation 23}$$

where $p(o(k)|s)$ is given by Equation 21, and K denotes the total duration of subsegment s in the training data. This gives $$0 = \sum_{k=1}^{K}\left[o(k) - \bar{\mu}_{o_s}\right] \approx \sum_{k=1}^{K}\left[o(k) - F'[z_0(k)]\mu_z(k) - B_s\right] = \qquad \text{Equation 24}$$

$$\sum_{k=1}^{K}\left[o(k) - F'[z_0(k)]\mu_z(k) - \frac{\{F[z_0(k)] + \mu_{r_s} - F'[z_0(k)]z_0(k)\}}{B_s}\right]$$

This gives the estimation formula:

$$\hat{\mu}_{r_s} = \frac{\sum_{k=1}^{K}[o(k) - F[z_0(k)]] - F'[z_0(k)]\mu_z(k) + F'[z_0(k)]z_0(k)]}{K} \qquad \text{Equation 25}$$

When the Taylor series expansion point is chosen to be the output of model stage-I with the target mean as the FIR filter's input, or $z_0(k)=\mu_z(k)$, Equation 25 is simplified to:

$$\hat{\mu}_{r_s} = \frac{\sum_{k=1}^{K}[o(k) - F[z_0(k)]]}{K}. \qquad \text{Equation 26}$$

For training the (static) base residual variances in the integrated implementation, the following is set $$\frac{\partial \log \prod_{k=1}^{K} p(o(k)|s)}{\partial \sigma_{r_s}^2} = 0 \qquad \text{Equation 27}$$

This gives $$\sum_k \left[\frac{-1}{[\sigma_{r_s}^2(F'[z_0(k)^2])^2\sigma_z^2(k)]}\right] + \qquad \text{Equation 28}$$

$$\sum_k \left[\frac{(o(k) - \bar{\mu}_{o_s})^2}{[\sigma_{r_s}^2 + (F'[z_0(k)^2])^2\sigma_z^2(k)]^2}\right] = 0,$$

or $$\sum_k \left[\frac{\sigma_{r_s}^2 + (F'[z_0(k)])^2\sigma_z^2(k) - (o(k) - \bar{\mu}_{o_s})^2}{[\sigma_{r_s}^2 + (F'[z_0(k)^2])^2\sigma_z^2(k)]^2}\right] = 0, \qquad \text{Equation 29}$$

Assuming the dependency of the denominator term, $(F'[z_0(k)])^2\sigma_z^2(k)$, on time k is not very strong, the approximate estimation formula is obtained as:

$$\hat{\sigma}_{r_s}^2 \approx \frac{\sum_k \left\{(o(k) - \bar{\mu}_{o_s})^2 - (F'[\mu_z(k)])^2\sigma_z^2(k)\right\}}{K} \qquad \text{Equation 30}$$

The above estimation formulas are applied iteratively since new boundaries of subsegments are obtained after the new updated parameters become available. The initial parameters used for the iteration are obtained using HTK for training monophone Hidden Markov Models (with three left-to-right states for each phone).

The following is an example of phonetic recognition results which can be used to evaluate the bi-directional, target-filtering HTM for both the cascaded and integrated approaches. This example is based on the widely used TIMIT database, and no language model is used in this example. The acoustic models are based on HTMs using the standard TIMIT label set, with slight expansion for diphthongs and affricates, in training the residual means and variances.

Phonetic recognition errors are tabulated using the 39 labels adopted by many researchers to report recognition results. The results are reported on the standard core test set with a total of 192 utterances by 24 speakers. An N-best rescoring paradigm is used to evaluate the HTM. For each of the core test utterances, A standard triphone Hidden Markov Model with a decision tree is used to generate a very large N-best list (list of plausible hypotheses) where N=1000. The average number (over the 192 utterances) of distinct phone sequences in this N=1000 list is 788, the remaining being due to variations in the phone segmentation in the same phone sequence. With the use of a flat phone language model and of the LPC cepstra as features (the same conditions as the HTM), the phone recognition accuracy for the HTK-implemented standard triphone Hidden Markov Model in N-best list rescoring, with (N=1001) and without (N=1000) adding reference hypotheses, is 64.04%. The sentence recognition accuracy is 0.0% for Hidden Markov Model, even with references included. That is, the Hidden Markov Model system does not score the reference phone sequence higher than the N-best candidates for any of the 192 test sentences. The HTM systems dramatically increase both phone and sentence recognition accuracies, as shown in Table 1 further below. The HTM performances for two types of cascaded (Cascaded Stage I and Cascaded Stage II) and integrated (Integrated Stage I and Integrated Stage II) implementations are evaluated. First, the HTM with Cascaded Stage I implementation uses Equation 11 for likelihood scoring, with the residual parameters ($\hat{\mu}_{r_s}$, $\hat{\sigma}_{r_s}^2$) trained by HTK based on the residual features computed as the difference between cepstral data and cepstral prediction. Second, a Cascaded Stage II implementation uses Equation 11 for scoring also, but with the parameters $\hat{\mu}_{r_s}$ and $\hat{\sigma}_{r_s}^2$ trained using Equations 26 and 30. A noticeable performance improvement is obtained after the new training. Third, an Integrated Stage I implementation uses Equation 21 for scoring, with the parameters $\hat{\mu}_{r_s}$ and $\hat{\sigma}_{r_s}^2$ trained by HTK in the same way as for the Cascaded Stage I implementation. Rather poor performance is observed. Finally, an Integrated Stage II implementation uses Equation 16 for scoring, with the parameters $\hat{\mu}_{r_s}$ and $\hat{\sigma}_{r_s}^2$ trained using Equations 26 and 30. The best performance, both in sentence and phone recognition accuracies, is achieved the Integrated Stage II implementation. The improvement is the greatest when references are added into the N-best list. Table 1 below includes a comparison of test results for the above-described four types of HTM implementations and for a triphone Hidden Markov Model (HMM) baseline (with context dependent parameters).

TABLE 1

| Types of the HTM | 101-Best (with ref.) | | 1001-Best (with ref.) | | 1000-Best (no ref.) | |
|---|---|---|---|---|---|---|
| | sent | phn | sent | phn | sent | phn |
| Cascaded Stage I | 26.6 | 78.8 | 16.2 | 76.4 | 0.0 | 71.8 |
| Cascaded Stage II | 52.6 | 86.8 | 33.1 | 81.0 | 0.0 | 71.7 |
| Integrated Stage I | 22.4 | 79.0 | 16.2 | 76.6 | 0.0 | 72.4 |
| Integrated Stage II | 83.3 | 95.6 | 78.1 | 94.3 | 0.5 | 73.0 |
| CD-HMM | 0.0 | 64.0 | 0.0 | 64.0 | 0.0 | 64.0 |

In the above experiments, performance is measured by percent sentence (sent) and phone (phn) recognition accuracies (%) in the core test set defined in the TIMIT database.

Although the present invention has been described with reference to particular embodiments, workers skilled in the art will recognize that changes may be made in form and detail without departing from the spirit and scope of the invention.

What is claimed is:

1. A method of recognizing speech comprising:
   receiving a speech signal;
   generating at least one possible sequence of hypothesized phonetic units for the received speech signal;
   generating a sequence of acoustic feature vectors from the received speech signal;
   identifying a sequence of Vocal Tract Resonance (VTR) values from the at least one sequence of phonetic units of the received speech using a finite impulse response filter; and
   generating a score for a sequence of hypothesized phonetic units based on the generated feature vectors from the speech signal and the sequence of vocal tract resonance values.

2. The method of claim 1 wherein generating a score comprises:
   generating a plurality of predicted feature vectors from the sequence of vocal tract resonance values using the predicted feature vectors to generate the score.

3. The method of claim 2 wherein the score is indicative of the closeness between the predicted feature vectors and the feature vectors generated from the speech signal.

4. The method of claim 2 wherein generating a score comprises:
   determining a probability for a generated feature vector of the received speech given a probability distribution that is based on the predicted feature vector.

5. The method of claim 4 wherein generating a score comprises:
   determining a probability of a sequence of generated feature vectors using a probability distribution based upon a plurality of predicted feature vectors with the feature vectors for the received speech.

6. The method of claim 1 wherein generating at least one possible sequence of hypothesized phonetic units comprise:
   generating an N-best list of possible sequences of hypothesized phonetic units.

7. The method of claim 1 wherein identifying a sequence of vocal tract resonance values comprises:
   identifying a sequence of target values for the vocal tract resonance values; and
   applying the sequence of target values to the finite impulse response filter to produce the sequence of vocal tract resonance values.

8. The method of claim 7 wherein applying the sequence of target values to the finite impulse response filter comprises:
   applying the sequence of target values to a finite impulse response filter that generates a value based on past target values and future target values.

9. The method of claim 7 wherein identifying a sequence of target values comprises identifying a separate target value for each phonetic unit in the at least one sequence of phonetic units.

10. The method of claim 7 wherein identifying a sequence of target values further comprises:
    determining a duration for each target value in the sequence of target values.

11. The method of claim 1 wherein the sequence of vocal tract resonance values are a sequence of vocal tract resonance distributions for the sequence of phonetic units.

12. The method of claim 4 wherein determining a probability for the generated feature vector comprises using a Taylor Series approximation to define the probability distribution.

13. The method of claim 2 wherein generating a score for a sequence of hypothesized phonetic units comprises:
using the vocal tract resonance values to determine a probability of a generated feature vector.

14. The method of claim 13 wherein determining a probability comprises:
using a linear approximation to a nonlinear function of the vocal tract resonance values.

15. A recognizer comprising:
a feature vector generator configured to generate at least one feature vector from a speech signal;
a trajectory generator configured to generate deterministic trajectories from a sequence of phonetic units;
a feature vector distribution generator configured to generate a distribution of possible feature vectors from the deterministic trajectories; and
a scoring module configured to generate a score for the generated feature vector using the distribution of possible feature vectors.

16. The recognizer of claim 15 wherein the trajectory generator generates vocal tract resonance trajectories based on a sequence of target values.

17. The recognizer of claim 15 wherein the trajectory generator comprises a finite impulse response filter configured to generate a trajectory value based on past target values and future target values.

18. The recognizer of claim 16 wherein the feature vector generator distribution generates a statistical mapping of the vocal tract resonance trajectories to a linear predictive coding (LPC) cepstrum.

19. The recognizer of claim 15 wherein the distribution generator identifies a predicted feature vectors from the trajectories and uses the predicted feature vector as the mean of the distribution.

20. The recognizer of claim 19 wherein the scoring module generates the score by determining a difference between a predicted feature vector and the generated feature vector from the speech signal.

* * * * *